United States Patent [19]

Tsutsui et al.

[11] Patent Number: 5,717,953
[45] Date of Patent: Feb. 10, 1998

[54] INFORMATION RECORDING DEVICE AND INFORMATION TRANSFER SYSTEM USING A HIGH-SPEED BUFFER FOR RECORDING IN PARALLEL ON A LOW-SPEED RECORDING MEDIUM

[75] Inventors: Kyoya Tsutsui, Kanagawa; Naoya Haneda, Tokyo, both of Japan

[73] Assignee: Sony Corporation, Tokyo, Japan

[21] Appl. No.: 338,538

[22] PCT Filed: Apr. 18, 1994

[86] PCT No.: PCT/JP94/00642

§ 371 Date: Jan. 11, 1995

§ 102(e) Date: Jan. 11, 1995

[87] PCT Pub. No.: WO94/24624

PCT Pub. Date: Oct. 27, 1994

[30] Foreign Application Priority Data

Apr. 16, 1993 [JP] Japan ................................ 5-090233
Sep. 30, 1993 [JP] Japan ................................ 5-245751

[51] Int. Cl.$^6$ .................................. G06F 12/02; G06F 13/372
[52] U.S. Cl. ........................ 395/865; 395/878; 364/DIG. 1
[58] Field of Search ........................ 395/775, 494, 395/878, 865, 552; 379/88; 364/DIG. 1; 370/354

[56] References Cited

U.S. PATENT DOCUMENTS 3,609,665  9/1971  Kronies et al. .................. 395/552
4,575,844  3/1986  Kosuge et al. .................. 370/354
4,891,835  1/1990  Leung et al. .................... 379/88
5,097,437  3/1992  Carson ............................ 395/595

Primary Examiner—Tod R. Swann
Assistant Examiner—J. Peikari
Attorney, Agent, or Firm—Jay H. Maioli

[57] ABSTRACT

An information transfer system comprises a random accessible recording medium, a request information input section connected to a detachable information recording device, and an information output section connected to the detachable information recording device, thus to output, through the information output section, information read out at random from the recording medium on the basis of request information input through the request information input section. The information recording device stores information input through an information input section into a temporary recording section thereafter to record a recording medium comprised of a plurality of recording medium pieces, thereby making it possible to correctly record information at a high speed even in the case where a recording medium having relatively low write speed is employed. Moreover, the information transfer system sequentially transfers information stored on the basis of an information transfer request signal which requires information transfer from information recording devices having a variety of memory structures and adapted for recording/reproducing input information. The information transfer system carries out a control to record input information in parallel in a traversing order with respect to a plurality of recording medium pieces, thereby making it possible to record information in parallel by simple control with respect to a variety of information recording devices constituted with a recording medium in which the write time is not fixed. Thus, this information transfer system makes it possible to transfer information at a high speed by simple hardware.

3 Claims, 22 Drawing Sheets

FIG.2c

RECORDING MEDIUM PIECE 31₃

| | |
|---|---|
| M63 | D128 |
| M62 | |
| M61 | D65 |
| M60 | ///// |
| M59 | ///// |
| M58 | ///// |
| M57 | D185 |
| ⋮ | ⋮ |
| M1 | D129 |
| M0 | |

FIG.2b

RECORDING MEDIUM PIECE 31₂

| | |
|---|---|
| M63 | D127 |
| M62 | D126 |
| M61 | D125 |
| M60 | D124 |
| M59 | D123 |
| ⋮ | ⋮ |
| M3 | D67 |
| M2 | D66 |
| M1 | |
| M0 | D64 |

FIG.2a

RECORDING MEDIUM PIECE 31₁

| | |
|---|---|
| M63 | D63 |
| M62 | D62 |
| M61 | D61 |
| M60 | D60 |
| M59 | D59 |
| ⋮ | ⋮ |
| M3 | D3 |
| M2 | D2 |
| M1 | D1 |
| M0 | D0 |

RECORD INFORMATION RECORDING MEANS 41

| m5 | e - 1 |
|---|---|
| m4 | e - 1 |
| m3 | 31₃ : M61 |
| m2 | 31₂ : M1 |
| m1 | 31₃ : M63 |
| m0 | 31₃ : M0 |

FIG.3

RECORD INFORMATION RECORDING MEANS 41

| m5 | e - 1 |
|---|---|
| m4 | M0 |
| m3 | e - 1 |
| m2 | M1 |
| m1 | e - 1 |
| m0 | e - 1 |

FIG.5

RECORDED INFORMATION D

| $D_{185}$ |
|---|
| $D_{184}$ |
| $D_{183}$ |
| $D_{182}$ |
| ⋮ |
| $D_{11}$ |
| $D_{10}$ |
| $D_9$ |
| $D_8$ |
| $D_7$ |
| $D_6$ |
| $D_5$ |
| $D_4$ |
| $D_3$ |
| $D_2$ |
| $D_1$ |
| $D_0$ |

FIG.24a

RECORDING MEDIUM PIECE 133

| | |
|---|---|
| M63 | //////// |
| M62 | //////// |
| M61 | //////// |
| M60 | //////// |
| M59 | //////// |
| M58 | //////// |
| M57 | $D_{185}$ |
| ⋮ | ⋮ |
| M1 | $D_{129}$ |
| M0 | $D_{128}$ |

FIG.24d

RECORDING MEDIUM PIECE 132

| | |
|---|---|
| M63 | $D_{127}$ |
| M62 | $D_{126}$ |
| M61 | $D_{125}$ |
| M60 | $D_{124}$ |
| M59 | $D_{123}$ |
| ⋮ | ⋮ |
| M3 | $D_{67}$ |
| M2 | $D_{66}$ |
| M1 | $D_{65}$ |
| M0 | $D_{64}$ |

FIG.24c

RECORDING MEDIUM PIECE 131

| | |
|---|---|
| M63 | $D_{63}$ |
| M62 | $D_{62}$ |
| M61 | $D_{61}$ |
| M60 | $D_{60}$ |
| M59 | $D_{59}$ |
| ⋮ | ⋮ |
| M3 | $D_3$ |
| M2 | $D_2$ |
| M1 | $D_1$ |
| M0 | $D_0$ |

RECORDED INFORMATION D

| $D_{185}$ |
| $D_{184}$ |
| $D_{183}$ |
| $D_{182}$ |
| ⋮ |
| $D_{11}$ |
| $D_{10}$ |
| $D_9$ |
| $D_8$ |
| $D_7$ |
| $D_6$ |
| $D_5$ |
| $D_4$ |
| $D_3$ |
| $D_2$ |
| $D_1$ |
| $D_0$ |

FIG.25d

RECORDING MEDIUM PIECE 133

| M63 | |
| M62 | |
| M61 | |
| M60 | |
| M59 | |
| M58 | |
| M57 | $D_{185}$ |
| ⋮ | ⋮ |
| M1 | $D_{129}$ |
| M0 | |

FIG.25c

RECORDING MEDIUM PIECE 132

| M63 | $D_{127}$ |
| M62 | $D_{126}$ |
| M61 | $D_{125}$ |
| M60 | $D_{124}$ |
| M59 | $D_{123}$ |
| ⋮ | ⋮ |
| M3 | $D_{67}$ |
| M2 | $D_{66}$ |
| M1 | |
| M0 | $D_{64}$ |

FIG.25b

RECORDING MEDIUM PIECE 131

| M63 | $D_{63}$ |
| M62 | $D_{62}$ |
| M61 | $D_{61}$ |
| M60 | $D_{60}$ |
| M59 | $D_{59}$ |
| ⋮ | ⋮ |
| M3 | $D_3$ |
| M2 | $D_2$ |
| M1 | $D_1$ |
| M0 | $D_0$ |

INFORMATION RECORDING DEVICE AND INFORMATION TRANSFER SYSTEM USING A HIGH-SPEED BUFFER FOR RECORDING IN PARALLEL ON A LOW-SPEED RECORDING MEDIUM

This application is a 371 of application number PCT/JP94/08642, filed Apr. 18, 1994.

TECHNICAL FIELD

This invention relates to an information recording device for recording, at a high speed, information into recording media in which write speeds are not uniform, and an information transfer system for transferring, at a high speed, information to various information recording devices.

BACKGROUND ART

The applicants of this invention have already proposed information transfer means for transferring information at a high speed from an information providing device to a recording (reproducing) device in which semiconductor memory is included, as described in the respective specifications and drawings of the Tokuganhei No. 4-304706 (Japanese Patent Application No. 304706/1992) and Tokuganhei No. 5-21729 (Japanese Patent Application No. 21729/1993).

FIG. 19 shows an information recording/reproducing device 200 to which technology as described above is applied. At this information recording/reproducing device 200, an information providing device connecting (coupling) terminal 201 is provided. Through this terminal, information can be copied from an information providing device of which indication is omitted into a recording medium provided within the information recording/reproducing device 200. Moreover, display means 202 and reproduction selector means 203 are equipped at this information recording/reproducing device 200. The content of information recorded in the recording medium within information recording/reproducing device 200 can be displayed on display means 202. Further, a user of this device 200 can selectively reproduce necessary information by using reproduction selector means 203 such as a push-button switch, etc. on the basis of information displayed on the display means 202.

In this case, the content of the information may include text information, speech information, video information and computer program data, etc., and is not particularly limited. It is to be noted that reproduction of program means an operation to execute that program, but, e.g., user may input information as occasion demands at the time of execution. Moreover, in the case where a reproduction signal from the recording medium is text data or video signal, that data or signal can be displayed on the display means 202 comprised of liquid crystal device, etc. In the case of speech information, that information can be output to, e.g., a so called earphone,. Although not illustrated in FIG. 19, speaker may be of course equipped in place of earphone 204, a or in addition to earphone 204. In that case, reproduced result of speech information may be output to the speaker. Further, a reproduction signal from recording medium may be output (delivered) to CRT (Cathode Ray Tube) or speaker, etc., externally provided by using external terminal (not shown). It should be noted that, while there is not particular limitation in connection with the kind of recording medium for recording information, it is convenient to use a semiconductor memory in which copies can be made at a high speed, random access is easy, and portability is excellent.

FIG. 20 is a perspective view of another actual example using the above-described technology. In this example, information recording/reproducing device 200 of FIG. 19 is of a structure in which it is physically separated into information recording device (unit) 210 and information reproducing device (unit) 220. Information reproducing device 220 in this case includes display means 222 and reproduction selector means 223 similar to the information recording/reproducing device 200 of the FIG. 19 mentioned above, and earphone 224 is also connectable to this device 220. It should be noted that since transmission/reception of data and control information is required between information recording device 210 and information reproducing device 220 at the time of reproduction, terminals for connecting (coupling) both devices are equipped at information recording device 210 (information reproducing device connecting terminal 212) and information reproducing device 220 (indication of connecting terminal is omitted). In the example of FIG. 20, the information recording device 210 is inserted into insertion/ejection hole 221 of information reproducing device 220, thereby making it possible to transmit information from the information recording device 210 to the information reproducing device 220. It is here noted that information providing device connecting terminal 211 and information reproducing device connecting terminal 212 of information recording device 210 may be also of a structure in which a single terminal is switched in use from a practical point of view.

FIG. 21 is a perspective view of an actual example of information providing device 230 using the above-described technology. Within the information providing device 230, a recording medium is provided. Information is recorded in this recording medium. It should be noted that although omitted in FIG. 21, employment of a method in which information to be recorded is transmitted by information transmitting means by wire or wireless is convenient. Of course, a recording medium may be directly inserted into device 230.

At information providing device 230 of FIG. 21, a plurality of display means 232 for displaying contents of information recorded in the recording medium or various information, e.g., price, etc. and a plurality of output selector means 231 for selecting information to be output from information providing device 230 of information displayed on these display means 232 are equipped. Thus, a person who desires to obtain information can select desired information. Acquisition of information is realized by inserting information recording/reproducing device 200 or information recording device 210 that the person who desires to obtain information has into insertion/ejection hole 234 of information providing device 230 to receive a copy of information therefrom.

FIG. 22 is a perspective view of another actual device 240 of an information providing device using the above-described technology. In this example, insertion hole 241 and ejection hole 242 are separated with a distance (spacing) therebetween. A person H who desires to obtain information can obtain information while walking (moving in a direction indicated by arrow A in the figure). Namely, in this case, information recording device 243 inserted from the insertion hole 241 is transferred (moved) in a direction indicated by arrow a in the figure within the device 240 by moving means of which indication is omitted within the information providing device 240, and information is copied from the information providing device 240 to information recording device 243 at that time. Thereafter, the information recording device 243 is ejected from the ejection hole 242. A device of such structure is convenient in the case of speedily providing information to many people.

FIG. 23 is a circuit diagram showing, in a block form, an actual example of transfer means included within information providing device 230 of FIG. 21 and information recording device 210 of FIG. 20 in transferring information from the device 230 to the device 210.

In FIG. 23, information which has been read out from recording medium 111 included within information providing device 230 is transferred into writing means 121 within information recording device 210 through transfer control circuit 112. This writing means 121 sequentially writes information which has been sent into recording medium pieces 131, 132, 133. Thus, transfer of information from information providing device 230 to information recording device 210 is completed. Reproduction of that information is realized by reading out information from respective recording medium pieces 131, 132, 133 by reading means 141 to send them to information reproducing device through terminal 103.

FIG. 24 shows an example of the state of recording into respective recording medium pieces 131, 132, 133 of FIG. 23. In this example, information $D_0 \sim D_{185}$ corresponding to 186 blocks as shown in a of FIG. 24 are recorded in the three recording medium pieces 131, 132, 133. Here, the term "block" indicates a unit of information. For example, one block may be information of bytes. Moreover, in this example, respective recording medium pieces 131, 132, 133 respectively have recording areas (memory blocks M0~M63) for storing information of 64 blocks as indicated by b, c, d of FIG. 24, wherein information $D_0 \sim D_{63}$ of the 0-th block to the 63-rd block of b of FIG. 24 are stored in the 0-th memory block M0 to the 63-rd memory block M63 of recording medium piece 131; information $D_{64} \sim D_{127}$ of the 64-th block to the 127-th block of c of FIG. 24 are stored in the 0-th memory block M0 to the 63-th memory block M63 of recording medium piece 132; and information $D_{128} \sim D_{185}$ of the 128-th block to the 185-th block of d of FIG. 24 are stored in the 0-th memory block M0 to the 57-th memory block M57 of recording medium piece 133.

Meanwhile, in the case where, e.g., semiconductor memory is used as the recording medium piece included in the information recording device as described above for which portability is required, if non-volatile memory which does not require back-up by battery is used, this is convenient in that there is no possibility that information recorded in the semiconductor memory disappears. As such a non-volatile memory, e.g., EEPROM (Electrically Erasable Programmable ROM) described in, e.g., Toshiba Review—1990 Vol. 45 No. 11 P.870–P.873 "Large Capacity Non-Volatile Memory" "Electronics Technology" 1992–11 p.23—may be used. However, since the EEPROM generally requires a long time for writing as compared to the volatile memory, employment of the method of sequentially recording information which have been sent from a information providing device as described above disadvantageously results in longer transfer time of information.

Further, with the above-described EEPROM, characteristics of elements constituting it have unevenness. Accordingly, writing into respective memory elements would not be necessarily completed within a fixed time. Some memory elements thus fail to correctly carry out writing.

Accordingly, in the case where an attempt is made to carry out recording as shown in FIG. 24 by using such recording medium pieces, if writing is not correctly carried out into the first memory block M1 of recording medium piece 132 and the 0-th memory block M0 of recording medium piece 133, there would be a resulting problem that a portion of information is missing.

This invention has been made in view of actual circumstances as described above. An object of this invention is to provide an information recording device such that even if a recording medium having relatively low writing speed is employed, it can correctly record information at a high speed, and an information transfer system capable of transferring such information at high speed, and is to provide an information transfer system capable of using a low cost recording medium, and an information recording device therefor.

DISCLOSURE OF THE INVENTION

A first information recording device of this invention comprises information input means to which input information is input temporary recording means for temporarily recording the input information, and a recording medium for recording the input information to temporarily store information input through the information input means into the temporarily recording means thereafter to record it into the recording medium.

Here, the recording medium is comprised of a plurality of recording medium pieces, and recording operations into the plurality of recording medium are carried out in parallel. Moreover, the information input means divides the input information in point of time to record divided information into the plurality of recording medium pieces. Further, the device of this invention is also provided with request information output means for outputting request information of information units of the input information, and the information input means carries out inputs of information units of the input information on the basis of the request information that the request information output means successively (sequentially) outputs. At this time, the information input means may be of a structure including the request information output means, thus making it possible to divide, in point of time, output of the request information and input of the input information. In addition, the recording medium consists of a plurality of recording units, and times required until completion of recording into respective recording units are different every respective recording unit.

An information recording device of this invention comprises first recording means comprised of a plurality of recording medium pieces in which it is not necessary that writing be completed within a predetermined time, and second recording means for recording record information of writing into the first recording means, thus to carry out recording into the first recording means in parallel.

Here, record information recorded into the second recording means includes information of a recording unit in a recording medium piece in which recording into the first recording means has not been correctly carried out, and information of the recording unit in the recording medium piece in which the information which has not been correctly recorded is actually recorded. Moreover, information in which recording into the first recording means has not been correctly carried out is recorded into a recording unit within the same recording medium piece as the recording unit in which recording has not been correctly corrected.

Further, a first transfer system according to this invention comprises a random accessible recording medium, request information input means connected to the detachable first information recording device of this invention, and information output means connected to the detachable first information recording device of this invention, wherein information output through the information output means is caused to be information read out at random from the recording medium on the basis of request information input through the request information input means.

It is to be noted that information transferred to the detachable information recording device are successively recorded in advance in the recording medium.

As stated above, in accordance with the information recording device of this invention, temporary recording means (buffer memory) is provided in the information recording device constituted with a plurality of recording medium pieces having relatively low write speed to write, in parallel, information transferred in a time divisional manner into the temporary recording means at speeds caused to be in correspondence with recording speeds of respective recording medium pieces to thereby permit high speed information write operation in the state of lesser number of pins for transfer operation.

Moreover, in accordance with the first information device, a scheme is employed such that if recording operation of a certain portion (recording unit) of information has been completed with respect to the recording medium, requests of information to be recorded next are successively transmitted to thereby prevent lowering of efficiency of recording speed even in the case where recording speeds are diverse in dependency upon respective portions of recording medium pieces, and to permit recording of information while maintaining compatibility even in the case where the numbers of recording medium pieces are diverse in dependency upon respective information recording devices.

Further, in accordance with the first information recording device of this invention, a spare (reserved) recording section (second recording medium) is ensured in advance to allow recording into another recording medium piece to be consistent even in the case where writing into a certain portion (recording unit) of recording medium piece (first recording means) has not been correctly carried out, thus making it possible to carry out parallel recording.

Moreover, in accordance with the first information transfer system of this invention, a random accessible recording medium is used for the recording medium of the information providing device to successively send necessary information in response to requests from the information recording device, thus making it possible to carry out efficient information transfer.

Further, the second information transfer system of this invention sequentially transfers information stored therein on the basis of a information transfer request signal to make a request for information transfer from information recording device of variety of memory structures and adapted for carrying out recording/reproduction of input information.

Here, the second information transfer system of this invention carries out, on the basis of information for determining size of information block delivered from the information recording device, transfer of the information every information block. Moreover, transfer from the information recording device of information for determining size of the information block is carried out prior to information transfer to the information recording device.

Namely, the second information transfer system of this invention includes a recording medium for storing information, information output means for outputting information read out from the recording medium, information transfer request signal input means to which the information transfer request signal is input, and a buffer memory for temporarily storing the information read out from the recording medium to take out information from the recording medium on the basis of the information transfer request signal input to the information transfer request signal input means to sequentially output information blocks temporarily stored in the buffer memory through the information output means.

Further, the second information transfer system of this invention includes information input means to input information for determining size of the information block transferred through the information input means to transfer information through the information output means every block of size determined in accordance with the information for determining size of the information block. Moreover, the input of information for determining size of the information block to be transferred is carried out prior to information transfer through the information output means.

Further, the second information recording device of this invention includes information input means to which information is input, a plurality of recording medium pieces for respectively recording information, and control means for controlling inputting by the information input means and writing into the plurality of recording medium pieces, the control means being operative to record information input to the information input means in parallel in traversing order with respect to the plurality of recording medium pieces.

Here, the second information recording device of this invention is provided with information transfer request signal output means for outputting an information transfer request signal to request information transfer to output the information transfer request signal to the information providing (transmitting) side of information transfer system. Further, the second information recording device includes a buffer memory for temporarily storing input information, wherein in recording input information into the plurality of recording medium pieces, the control means carries out a control on the basis of information from register in which information capable of calculating information to be written into the buffer and information capable of calculating information to be written into the plurality of recording medium pieces are stored. Buffer memories are provided in correspondence with the plurality of recording medium pieces as the buffer memory, and information output first of the information stored in respective buffer memories are respectively input first to the buffer memories.

Further, the second information recording device of this invention includes information output means for outputting information recorded in the recording medium pieces, wherein the information output means also outputs information for determining size of the output information block along with information from the recording medium pieces. At this time, the information output means carries out output of information for determining size of the output information block prior to output of information from the recording medium pieces.

The recording medium piece of the second information recording device of this invention is comprised of Electrically Erasable Programmable Read Only Memory.

In accordance with the second information recording device and the information transfer system of this invention, recording is carried out so that information is stored in traversing order into a plurality of recording medium pieces, thereby making it possible to transfer information at a high speed by simple control with respect to variety of information recording devices constituted with recording media having write speeds varying depending upon recording position.

Further, buffer memory is used, thereby making it possible to absorb unevenness of write speeds. Accordingly, efficient information transfer can be realized.

In addition, buffer memory is provided also on the information providing (transmitting) of information transfer system for transferring (transmitting) information, whereby even if a recording medium having relatively low read-out speed is used, it becomes possible to constitute the information providing (transmitting) section of the information transfer system.

BRIEF DESCRIPTION OF THE DRAWINGS

FIGS. 2A, 2B and 2C show a view for explaining an information recording method in the first embodiment.

FIG. 3 is a view for explaining the operation at a record information recording means of the information recording device of the first embodiment.

FIG. 5 is a view for explaining the operation at another record information recording means of the information recording device of the first embodiment.

FIGS. 24A, 24B, 24C and 24D show a view for explaining a conventional information recording method.

FIGS. 25A, 25B, 25C and 25D show a view for explaining aspects of problems of the conventional information recording method.

BEST MODE FOR CARRYING OUT THE INVENTION

Preferred embodiments of this invention will now be described with reference to the attached drawings.

Figure 1:
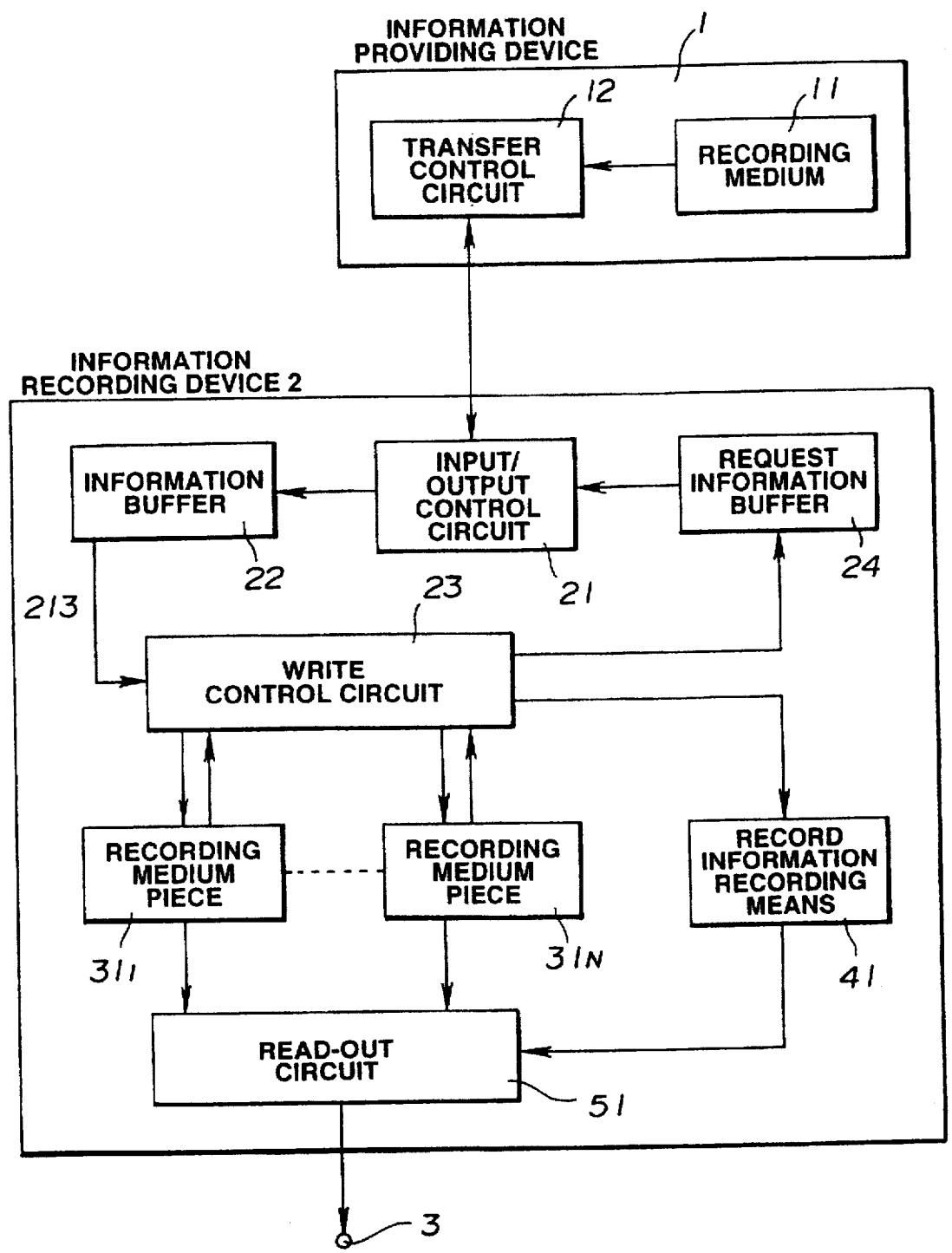
FIG. 1 is a circuit diagram showing, in a block form, an outline of the configuration of an information recording device and an information providing device of a first embodiment of this invention.

Information recording device (unit) 2 of the first embodiment of this invention includes, as shown in FIG. 1, input/output control circuit 21 serving as information input means to which input information from information providing device 1 is input, information buffer 22 serving as temporary recording means for temporarily recording the input information, and a plurality of recording medium pieces $31_1$–$31_N$ serving as recording media for recording the input information to temporarily store information input through the input/output control circuit 21 into the information buffer 22 thereafter to record them into the recording medium pieces $31_1$–$31_N$.

The information transfer system of the first embodiment of this invention comprises the information recording device 2 and information providing device 1, and includes recording medium 11 of information providing device 1 as a random accessible recording medium, write control circuit 23 and request information buffer 24 serving as request information input means, the input/output control circuit 21 which constitute detachable information recording device 2 of this embodiment, transfer control circuit 12 of information providing device 1 of this invention, and read-out circuit 51 as information output means which similarly constitutes detachable information recording device 2 of this embodiment, wherein information output through the read-out circuit 51 becomes in correspondence with information read out at random from recording medium 11 of the information providing device 1 on the basis of request information input through the request information input means.

The first embodiment of this invention will now be described with reference to FIG. 1.

FIG. 1 is a circuit diagram illustrated in a block form of the information transfer system showing information recording device 2 of the first embodiment of this invention along with information providing device 1 according to this invention.

In FIG. 1, transfer of information is carried out by designating block of information to be transferred by input/ output control circuit 21 provided within information recording device 2. Transfer control circuit 12 provided within information providing device 1 reads out information of a necessary block from recording medium 11 on the basis of that request to send it into information buffer 22 through the input/output control circuit 21.

Here, information temporarily recorded into the information buffer 22 are written, in parallel, into a plurality of (N number of) recording medium pieces of recording medium piece $31_1$~$31_N$ by write control circuit 23. In this case, there is unevenness in times required for writing into respective memory blocks (i.e., recording areas) of the recording medium pieces $31_1$~$31_N$. Whether correct writing is necessarily carried out in a fixed time cannot be ensured. However, there is described, also in the above-mentioned literatures: Toshiba Review 1990 Vol. 45 No. 11 P. 870–873 "Large Capacity Non-Volatile Memory", and "Electronics Technology" 1992–11, P.23—, a method of carrying out writing into recording medium pieces thereafter to read out the written contents to examine whether they are in correspondence with information that are intended to be written, thereby making it possible to check whether correct writing operations have been conducted, whereby in the case where any correct writing has not been carried out, writing and checking operations are repeated up to a predetermined number of times, thus to improve writing reliability.

In the device of this embodiment, such function is included in respective recording medium pieces $31_1$~$31_N$. Thus, information as to whether correct recording operations are completed is also sent to the write control circuit 23.

The write control circuit 23 writes record information indicating whether information of respective memory blocks of recording medium pieces $31_1$~$31_N$ are valid into record information recording means 41, and records, in the case of failure of writing, the information of the block corresponding thereto into any other memory block. Moreover, when writing information of the corresponding block is completed, write control circuit 23 determines information to be stored next in information buffer 22 to record its request information into request information buffer 24. Input/output control circuit 21 makes a request for information transfer to transfer control circuit 12 of information providing device 1 on the basis of the content of request information buffer 24.

The above-mentioned operation is repeated until transfer operations of all information are completed.

At the time of reproduction of information, read-out circuit 51 reads out information from respective recording medium pieces $31_1$~$31_N$ on the basis of record information recorded in the record information recording means 41 to send them to a reproducing device (not shown) through terminal 3.

a, b, c of FIG. 2 are views showing the example where information of 186 blocks are recorded into, e.g., three recording medium pieces $31_1$, $31_2$, $31_3$ in a manner as described above, and FIG. 3 shows an example of record information recorded in record information recording means 41 of the information recording device 2 in that case.

In this example, information of 186 blocks similar to that of a of the FIG. 24 mentioned above are recorded into three recording medium pieces $31_1$, $31_2$, $31_3$. Here, the 1-st memory block M1 of recording medium piece $31_2$ or the 0-th memory block M0 and the 62-th memory block M62 of recording medium piece $31_3$ indicate memory blocks in which writing could not be correctly carried out.

Moreover, in this example, respective recording medium pieces $31_1$, $31_2$, $31_3$ can store information of 64 blocks.

Information $D_0$~$D_{63}$ of the 0-th block to the 63-th block are stored in the 0-th memory block M0 to the 63-th memory block M63 of recording medium piece $31_1$. Information $D_{64}$~$D_{127}$ of the 64-th block to the 127-th block are stored in the 0-th memory block M0 to the 63-th memory block M63 of recording medium piece $31_2$ except for information D65 of the 65-th block, and information $D_{65}$ of the 65-th block is recorded (stored) in the 61-th memory block of recording medium piece $31_3$. Further, information $D_{128}$~$D_{185}$ of the 128-th block up to the 185-th block are stored in the 0-th memory block M0 to the 57-th memory block M57 of recording medium piece $31_3$ except for information of the 128-th block, and information $D_{128}$ of the 128-th block is recorded (stored) in the 63-th memory block M63 of recording medium piece $31_3$.

As stated above, as long as recording operations are normally carried out with respect to respective recording medium pieces, information of respective blocks are recorded in order. However, in the case where recording has not been completed within a predetermined time with respect to a certain memory block, information of that block is recorded into any other memory block, and information indicating that such exceptional recording has been carried out is recorded into record information recording means 41 as shown in FIG. 3.

Into record information recording means 41, information to the effect that exceptional recording has been carried out is recorded as described above. For example, in even addresses and odd addresses of storage area within the record information recording means 41, information indicating the position of a memory block in which the information of a corresponding block is to be primarily recorded and the position of memory block in which information of the corresponding block is actually recorded are respectively recorded. In the example of FIG. 3, it is indicated that exceptional recording as described below is carried out. Namely, information indicating that information which is to be primarily recorded in the 0-th memory block M0 of recording medium piece $31_3$ is recorded in the 63-th memory block M63 of recording medium piece $31_3$ is recorded in the 0-th address m0 and the 1-st address m1 of the storage area of record information recording means 41. Moreover, information indicating that information which is to be primarily recorded in the 1-st memory block M1 of recording medium piece $31_2$ and recorded in the 61-th memory block M61 of recording medium piece $31_3$ is recorded in the 2-nd address m2 and the 3-rd address m3 of the storage area of record information recording means 41. Information $e_{-1}$ (e.g., information of −1) indicating that such exceptional recording is carried out with respect to only two addresses is recorded in the 4-th address m4 of record information recording means 41.

Such exceptional record information (record information) is recorded into record information recording means 41 at the time point when such a recording has been carried out. For this reason, in the case of this example, write operations are carried out in parallel, and record information relating to the 128-th block in which exceptional recording has been carried out earlier is recorded prior to record information relating to the 65-th block. Moreover, in the case where recording is exceptionally carried out at a position different from the primary recording position as described above, such recording is carried out in order from the aftermost far end of the empty area. When recording is carried out in this way, a recording position can be determined irrespective of the length of information to be recorded without allowing the recording area to be useless. This is convenient.

It is to be noted that the method of recording into respective recording medium pieces $31_1$, $31_2$, $31_3$ and record information recording means 41 is not necessarily limited to that shown in FIGS. 2, 3, but various other methods may be conceivable.

Figure 4C:
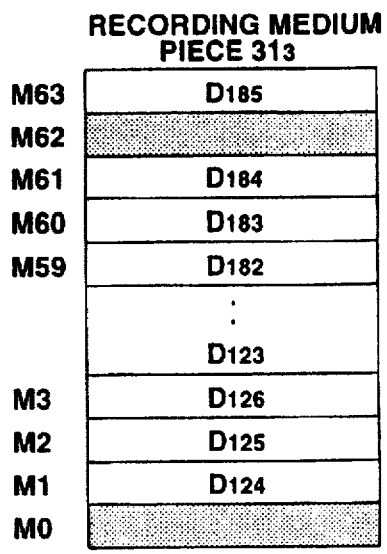
FIGS. 4A, 4B and 4C show a view for explaining another information recording method of the information recording device of the first embodiment.
Figure 4B:
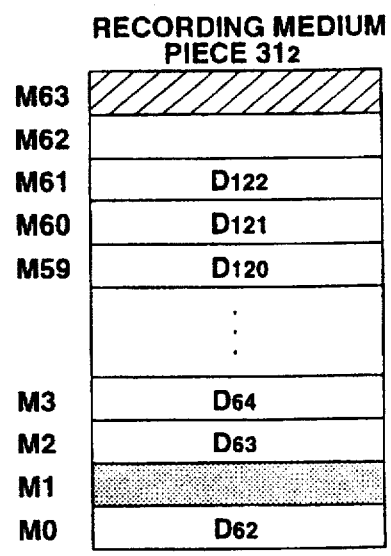
Figure 4A:
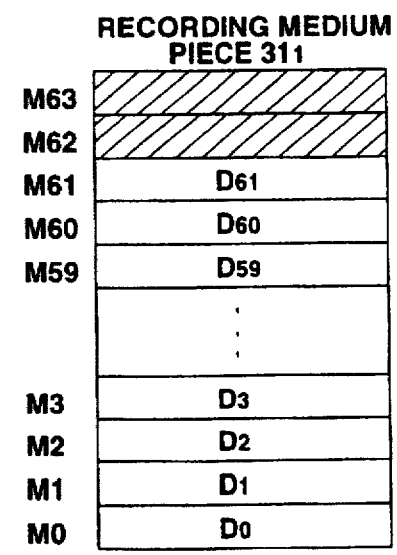

FIGS. 4, 5 shows a recording method different from the method which has been explained with reference to FIGS. 2 and 3 in a manner similar to that of FIGS. 2, 3 mentioned above. In respective recording medium pieces $31_1$, $31_2$, $31_3$, spare (reserved) areas are respectively ensured. In the case of this example, areas corresponding to two memory blocks are ensured as a spare area in respective recording medium pieces $31_1$, $31_2$, $31_3$. In the event that write operations into respective memory blocks cannot be correctly carried out, each corresponding information is written into the next memory block. Since the spare areas are respectively fixedly determined with respect to respective recording medium pieces $31_1$, $31_2$, $31_3$, the relationship between information of recording ranges of blocks to be recorded and recording medium pieces in which that information of regarding ranges of respective blocks are recorded is determined. Accordingly, also in this case, information transfer by parallel writing can be carried out.

FIG. 5 shows the state of recording of record information into the record information recording means 41 in the case where writing as described above is carried out with respect to respective recording medium pieces $31_1$, $31_2$, $31_3$. In this example, record information with respect to recording medium piece $31_1$ is allocated to the 0-th address m0 to the 1-st address m1 of record information recording means 41, record information with respect to recording medium piece $31_2$ is allocated to the 2-nd address m2 to the 3-rd address m3, and record information with respect to recording medium piece $31_3$ is allocated to the 4-th address m4 to the 5-th address m5. In memory areas of these respective addresses, e.g., information of numbers of memory blocks in which the above-mentioned writing is not correctly carried out (memory block M1 of recording medium piece $31_2$ and memory block M0 of recording medium piece $31_3$) are recorded. In this example, information $e_{-1}$ (e.g., -1) is information of dummy memory block. Namely, since it is unnecessary to record information relating to position of memory block in which recording is correctly carried out in fact, information $e_{-1}$ of this dummy memory block is stored.

From facts as described above, at the time of reproduction, in a manner as described above, in the case where a memory block in which writing is not correctly carried out is detected, the number of that block is increased (incremented) by one, thereby making it possible to easily obtain correct information.

It should be noted that method of taking the spare (reserved) areas of respective recording medium pieces $31_1$, $31_2$, $31_3$ is not necessarily limited to the method of taking such areas so that they have the same sizes with respect to all recording medium pieces, but may be, e.g., a method of transmitting, from information recording device 2 to information providing device 1, information of recording ranges of blocks recorded in respective recording medium pieces prior to the start of information transfer. For example, in the case of semiconductor memory in which whether writing is successful is determined by the influence of oxide film thickness, there may be employed a method in which information recording device 2 carries out, in advance, recording and reproduction of information to specify memory block or blocks in which recording is not correctly carried out to determine recording ranges of block information recorded in respective recording medium pieces $31_1$, $31_2$, $31_3$ on the basis of the specified memory block or blocks.

Further, as another recording method, there may be a method in which, in place of recording record information into the record information recording means 41 as described above, information encoded by using, e.g., error correction code, is transferred from information providing device 1 to record it into a recording medium (recording medium piece) within information recording device 2.

Figure 6:
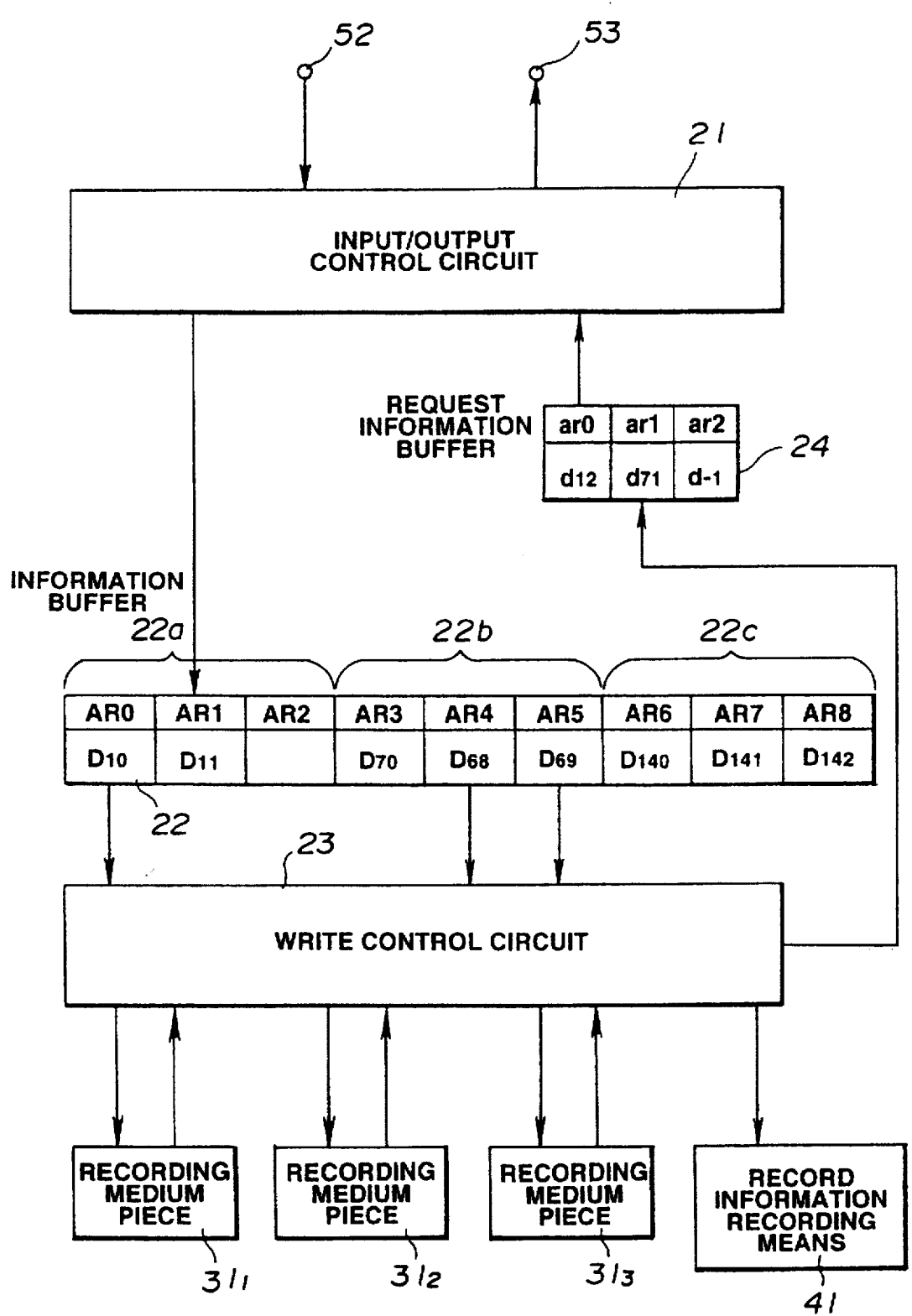
FIG. 6 is a circuit diagram illustrated in a block form for explaining, in more detail, the essential part of the information recording device of the first embodiment.

FIG. 6 is a circuit diagram illustrated in a block form for explaining, in more concrete terms, the configuration of FIG. 1 by using the example of the state of recording carried out as shown in FIGS. 2 and 3.

In FIG. 6, information buffer 22 comprises three portions $22a$, $22b$, $22c$ corresponding to respective recording medium pieces $31_1$, $31_2$, $31_3$, thus making it possible to record information of respective blocks into portion $22a$ (recording areas AR0~AR2), portion $22b$ (recording areas AR3~AR5), portion $22c$ (recording areas AR6~AR8) as recording areas AR0 to AR2, AR3 to AR5, AR6 to AR8. Further, request information buffer 24 includes three memory areas ar0, ar1, ar2, thus making it possible to store request information d into respective areas.

It is here assumed that, e.g., at a certain time point, information $D_{10}$, $D_{69}$, $D_{140}$ of the 10-th block, the 69-th block, the 140-th block are respectively written in parallel into recording medium pieces $31_1$, $31_2$, $31_3$. In parallel thereto, information $D_{12}$ of the 12-th block is being stored into information buffer 22. This information is information of a block obtained because request information having the highest priority rank of request information d stored in request information buffer 24 is sent to information providing device 1 through input/output control circuit 21, and is then sent back from information providing device 1. In the case of this example, priority rank of request information d is in correspondence with the order recorded in request information buffer 24.

In this example, at the time of start of information transfer, the input/output control circuit 21 stores at a time three information sets of the leading blocks which are to be recorded into respective recording medium pieces $31_1$, $31_2$, $31_3$ so that information buffer 22 is filled. When the writing operations into recording medium pieces are completed, write control circuit 23 writes, into request information buffer 24, the number of the information of the lowest number which is not yet recorded into any recording medium piece and is not also stored in information buffer 22 of the information sets which are to be recorded into corresponding recording medium pieces. In the case of this example, information $D_{68}$ of the 68-th block of information of blocks stored in information buffer 22 has already undergone writing into recording medium piece $31_2$, and request information $d_{71}$ of information $D_{71}$ of the 71-th block is already written in request information buffer 24. In this case, request information $d_{-1}$ (e.g., information of -1) indicates the state where there is no request information.

Moreover, the request information d sent to information providing device 1 through terminal 53 and information sent from information providing device 1 through terminal 52 are caused to undergo transmission/reception in a time divisional manner, thereby making it possible to lessen the number of pins for carrying out transmission of information between information providing device 1 and information recording device 2. Since information quantity of the request information d is small, even if information is caused to mutually undergo transmission/reception in a time divisional manner, there is no possibility that the time until completion of information transfer from information providing device 1 is extremely long.

Figure 7:
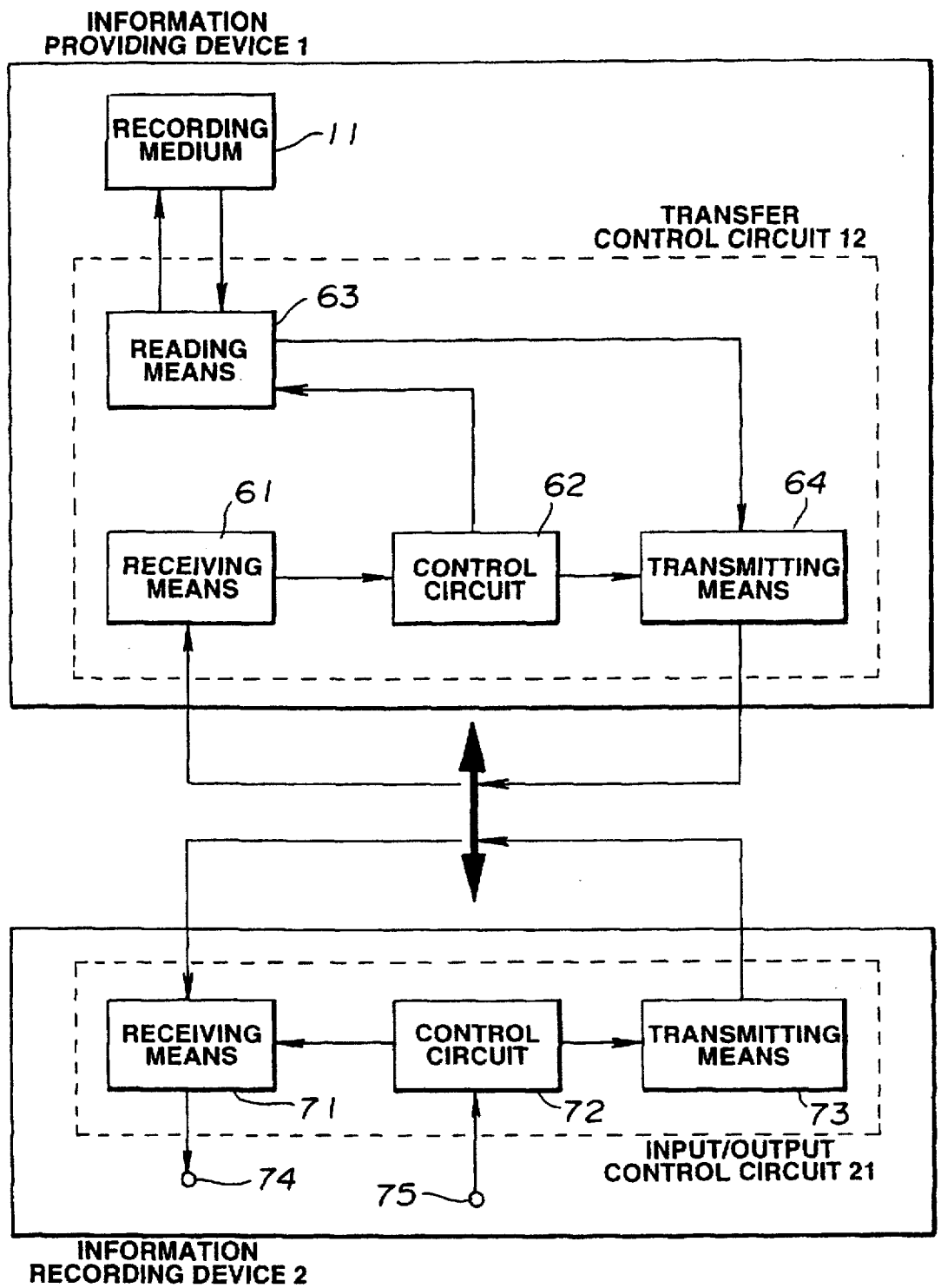
FIG. 7 is a circuit diagram illustrated in a block form for explaining, in more detail, an information transfer control circuit of the information providing device and an input/output control circuit of the information recording device of the first embodiment.

FIG. 7 is a circuit diagram showing, in a block form, an example of the configuration of transfer control circuit 12 within information providing device 1 and input/output control circuit 21 within information recording device 2 which carry out therebetween transmission and reception of information in a manner as described above. Moreover, FIG. 8 is a view showing the state of time division of transmission and reception carried out by these devices 1 and 2.

Figure 8:
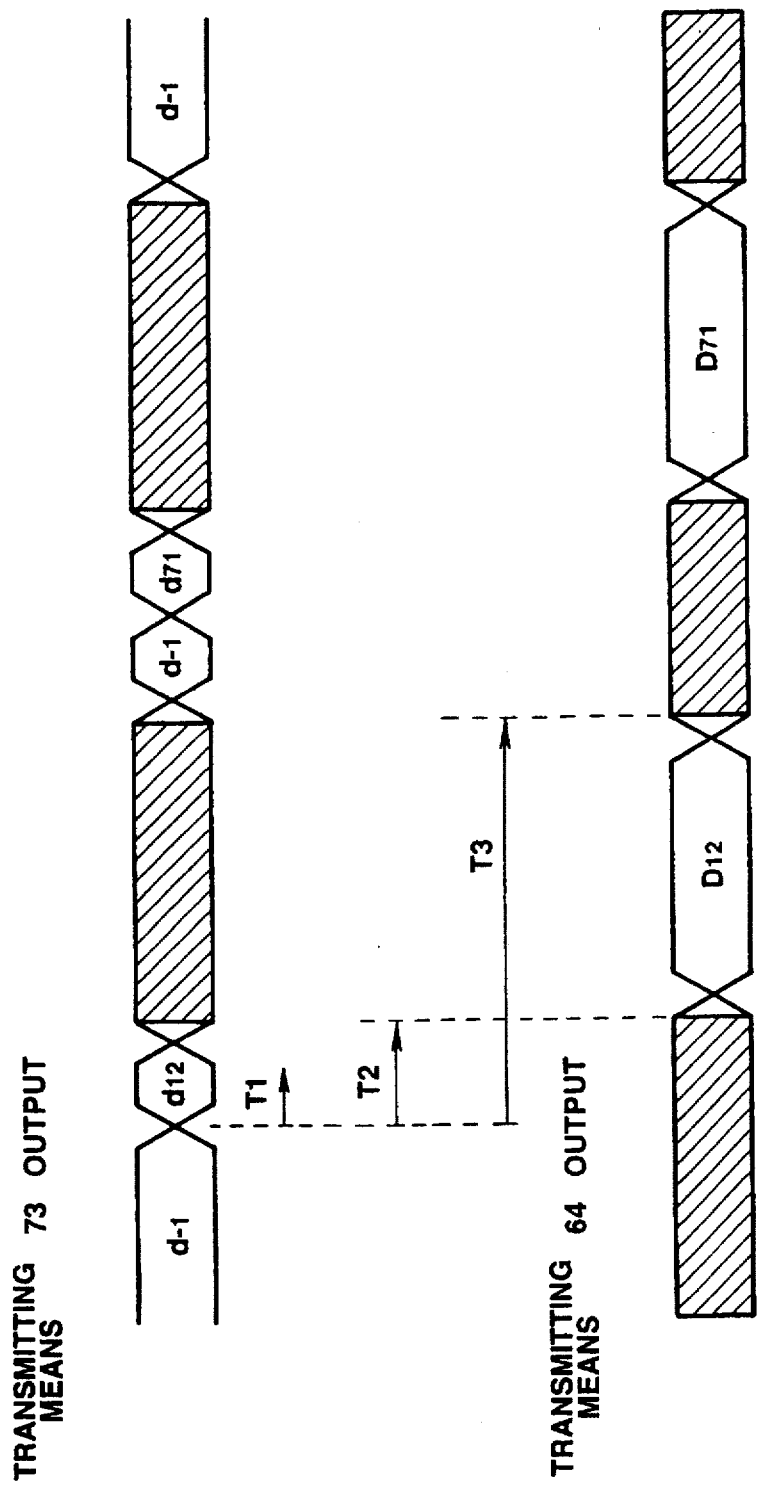
FIG. 8 is a view for explaining information transfer between devices of the first embodiment.

In these FIGS. 7 and 8, transmitting means 64 of transfer control circuit 12 is in high impedance state as the initial state. Transmitting means 73 of input/output control circuit outputs, e.g., information $d_{-1}$ (e.g., information of −1, etc.), as long as no information request is issued. When a request is made for information from information providing device 1, the block number of that information is sent out. This block number d12 is maintained for a time period indicated by T1 in FIG. 8. By the time when a time period indicated by T2 in the figure is passed after having been switched to block number d12 from the information of $d_{-1}$, the output of transmitting means 64 is switched to a high impedance state. This state is maintained until a time period of T3 is passed from the time when switching to block number d12 was carried out.

Control circuit 62 within transfer control circuit 12 detects switching into a block number from $d_{-1}$ from a signal sent from receiving means 61. Information which has been read out from recording medium 11 through reading means 63 is transmitted through transmitting means 64 of transfer control circuit 12 within a predetermined time period during which transmitting means 73 within information recording device 2 is in a high impedance state. Receiving means 71 within information recording device 2 receives this information under control of control circuit 72 which has predetected the timing of the transmission of this information.

It should be noted that even in the case where the recording method shown in the FIGS. 2, 3 mentioned above is adopted, even in the case where the recording method shown in FIGS. 4, 5 is employed, or even in the case where recording is carried out by using an error correction code, writing speeds into respective memory blocks are not uniform, and the numbers of recording medium pieces 31 in respective recording devices 2 are not necessarily the same. For this reason, block information requested at respective time points during transfer irregularly vary. Further, in order to carry out, in parallel, writing into a large number of recording medium pieces 31, information must be read out from recording medium 11 within information providing device 1 at speeds which can cope with such changes. Accordingly, it is convenient that recording medium 11 within information providing device 1 includes semiconductor memory, e.g., SRAM (Static RAM), etc. which can perform random access and read-out operation at a very high speed.

While explanation has been made by taking an example of the case where speech information is transferred from information providing device 1 to information recording device 2 as shown in FIG. 2, this invention can be applied to the case where information is transferred from the information providing (transmitting) side in the general information transfer system to the information recording device serving as the information receiving side, and information contents handled in the system may be applied to various information without being necessarily limited to speech information.

The information recording device and the information transfer system of this embodiment may have, e.g., an appearance corresponding to the FIGS. 19–22 mentioned above, although illustration is omitted.

As is clear from the foregoing description, in the information recording device of the first embodiment of this invention, temporary recording means are provided at information recording device constituted with a plurality of recording medium pieces having relatively low write speed to write information transferred in a time divisional manner into the temporary recording means in parallel at speeds caused to be in correspondence with recording speeds of respective recording medium pieces, thereby making it possible to write information at a high speed in the state having a lesser number of pins for information transfer. Moreover, if a recording operation of a certain portion (recording unit) of information is completed, requests of information to be recorded next are successively transmitted, thereby making it possible to prevent lowering of efficiency of recording speed even in the case where recording speeds are diverse in dependency upon respective portions of recording medium pieces. Further, even in the case where the numbers of recording medium pieces are diverse in dependency upon respective information recording devices, recording of information can be made while maintaining compatibility. In addition, spare (reserved) recording portions (second recording means) are ensured, whereby even in the case where writing into a certain portion (recording unit) of a recording medium piece (first recording means) is not correctly carried out, parallel recording can be made in a manner to allow recording into other information recording medium pieces to be consistent.

Further, in the information transfer system of the first embodiment of this invention, a random accessible recording medium is used as recording medium of information providing apparatus to successively send necessary information in response to requests from the information recording device, thus making it possible to carry out an efficient transfer of information.

As described above, in accordance with the first embodiment of this invention, it is possible to correctly record information in parallel into the recording device constituted with recording media of which reliability is not so high, and to transfer information at a high speed.

Figure 9:
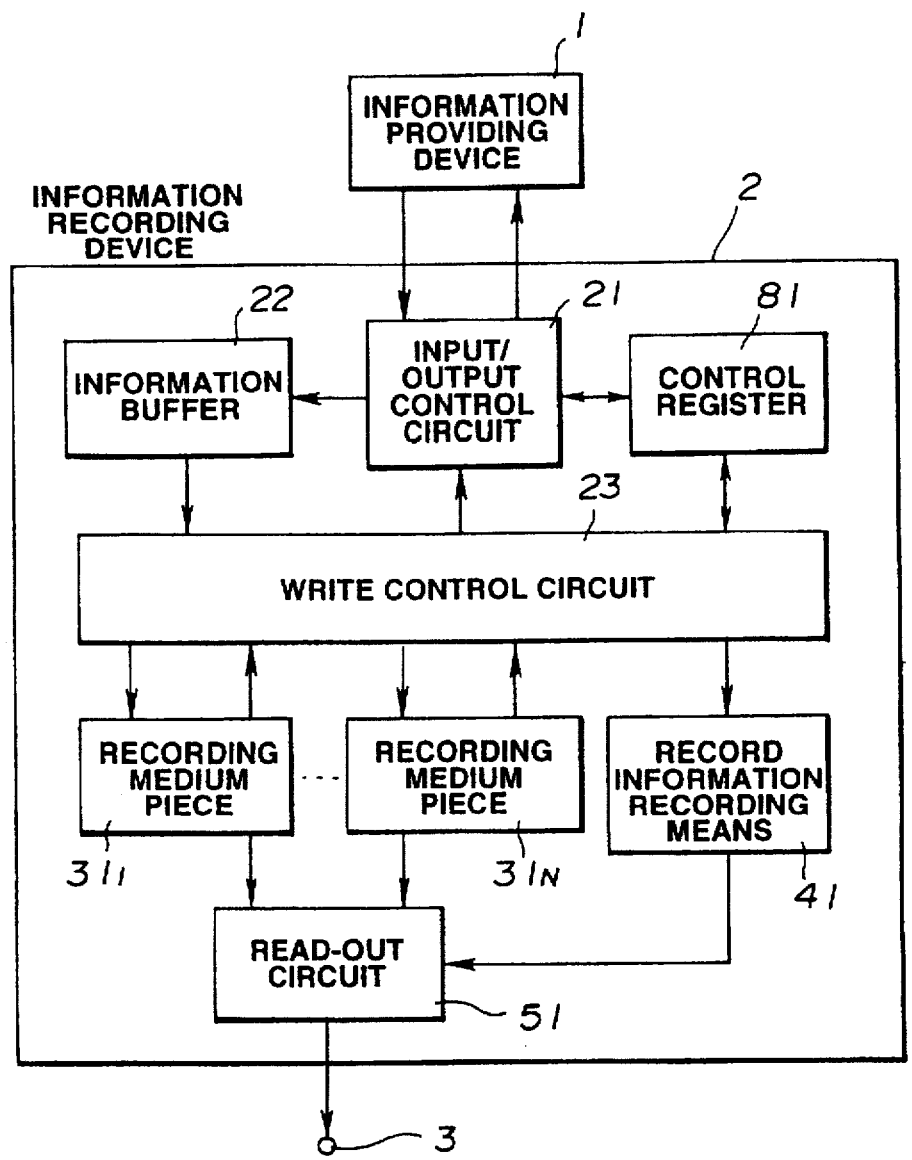
FIG. 9 is a circuit diagram showing, in a block form, an outline of the configuration of an information recording device and an information providing device of a second embodiment of this invention.

The second embodiment of this invention will now be described with reference to FIG. 9. FIG. 9 is a circuit diagram showing information recording device 2 of the second embodiment of this invention along with information providing device 1 according to this invention.

Also in the second embodiment shown in FIG. 9, the transfer of information is carried out by transmitting an information transfer request signal to information providing device 1 by input/output control circuit 21 provided within information recording device 2. Information providing device 1 sends an information block to information buffer 22 through input/output control circuit 21 on the basis of its request.

Moreover, information temporarily recorded in the information buffer 22 is written in parallel into a plurality of (N number of) recording medium pieces of recording medium piece $31_1$~recording medium piece $31_N$ by write control circuit 23. There is unevenness in times required for writing into respective memory blocks (recording areas) of the recording medium pieces $31_1$~$31_N$. Therefore, it is not necessary that correct writing is carried out in a fixed time. However, there may be employed a method of carrying out writing into recording medium pieces thereafter to read out the written content to examine whether it is in correspondence with information that is intended to be written, thereby making it possible to check whether correct writing has been conducted, whereby in the case where correct writing has not been carried out, writing and checking operations are repeated up to a predetermined number of times, thus to improve writing reliability. Also in the second embodiment, the function as described above is included in respective recording medium pieces $31_1$–$31_N$. Thus, information as to whether correct recording is completed is also sent to the write control circuit 23.

Further, in the second embodiment, the write control circuit 23 writes record information indicating whether information of respective memory blocks of recording medium pieces $31_1$–$31_N$ are valid into record information recording means 41, and records, in the case of failure of writing, information of the block corresponding thereto into any other memory block. Moreover, when writing of information of the corresponding block is completed, write control circuit 23 records the number of the block in which writing is to be carried out next into control register 81. Input/output control circuit 21 makes a request for information transfer to information providing device 1 on the basis of the content of control register 81.

The above-mentioned operation is repeated until transfer operations of all information are completed.

Figure 10C:
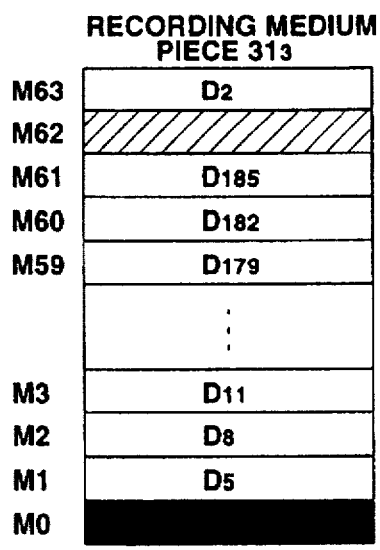
FIGS. 10A, 10B and 10C show a view for explaining an information recording method in the information recording device of the second embodiment.
Figure 10B:
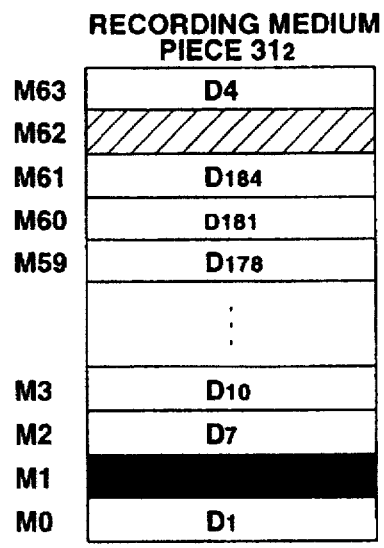
Figure 10A:
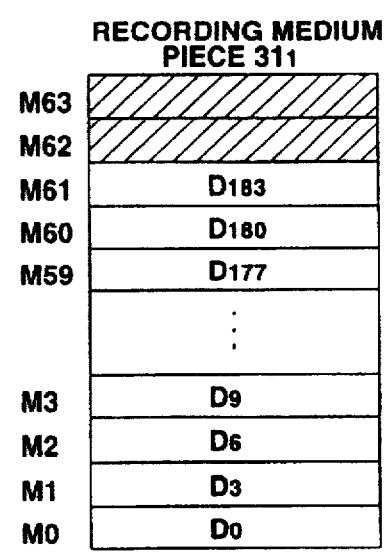
Figures 11, 12:
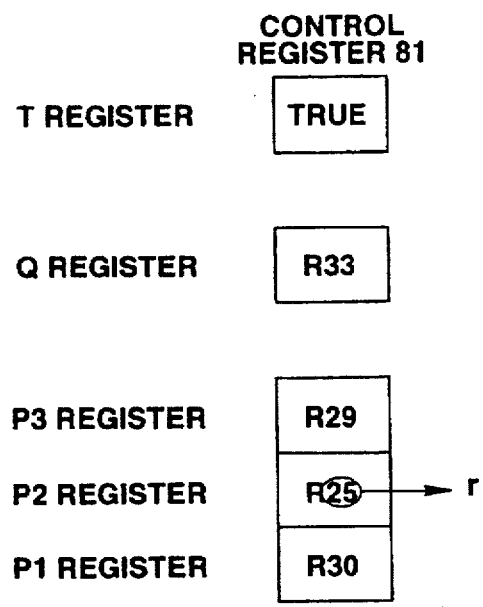
FIG. 11 is a view for explaining the operation at record information recording means of the information recording device of the second embodiment.
FIG. 12 a view for explaining the operation of a control register of an information transfer system of the second embodiment.

At the time of reproduction of information, read-out circuit 51 reads out information from respective recording medium pieces $31_1$–$31_N$ on the basis of record information recorded in the record information recording means 41 to send them to reproducing device (not shown) through terminal 3.

a, b, c of FIG. 10 are views showing an example where information of 186 blocks are recorded into, e.g., three recording medium pieces $31_1$, $31_2$, $31_3$ in the second embodiment, and FIG. 11 shows an example of record information recorded in record information recording means 41 of the information recording device 2 in that case in the second embodiment.

In the example of FIG. 10, information of 186 blocks similar to that of a of FIG. 24 mentioned above are recorded into three recording medium pieces $31_1$, $31_2$, $31_3$. Here, the 1-st memory block M1 of recording medium piece $31_3$ indicate a memory block in which writing could not be correctly carried out. Moreover, respective recording medium pieces $31_1$, $31_2$, $31_3$ can store information of 64 blocks. By these recording medium pieces $31_1$, $31_2$, $31_3$, information of 186 blocks similar to a of the FIG. 24 mentioned above are stored.

In this example, as long as writing can be correctly carried out into recording medium pieces, information of the 0-th block to the 185-th block are recorded in a order indicated by a, b, c of FIG. 10 in a manner to traverse three recording medium pieces $31_1$, $31_2$, $31_3$. Further, the number of blocks recorded in respective recording medium pieces is increased (incremented) by 3. The merit of employment of this method of carrying out writing in such order will be described later.

Here, in the case where recording is not completed within a predetermined time with respect to a certain memory block, information of that block is recorded into any other memory block. Information indicating that such exceptional recording has been carried out is recorded into record information recording means 41 as shown in FIG. 11.

Information to the effect that exceptional recording has been carried out as described above is recorded into record information recording means 41 of the second embodiment. For example, in even addresses and odd addresses of the storage area within the record information recording means 41, the information indicating position of the memory blocks in which information of the corresponding block are to be primarily recorded and the position of the memory block in which information of corresponding blocks are actually recorded are respectively recorded. In the example of FIG. 11, information indicating that information which is to be primarily recorded in the 0-th memory block M0 of recording medium piece $31_3$ and recorded in the 63-th memory block M63 of recording medium piece $31_3$ is recorded in the 0-th address m0 and the 1-st address m1 of record information recording means 41. Moreover, information indicating that information which is to be primarily recorded in the 1-st memory block M1 of recording medium piece $31_2$ and recorded in the 63-th memory block M63 of recording medium piece $31_2$ is recorded in the 2-nd address m2 and the 3-rd address m3 of the storage area of record information recording means 41. It is indicated that information $e_{-1}$ (e.g., information of −1) indicating that such exceptional recording is carried out with respect to only two addresses is recorded in the 4-th address m4 of record information recording means 41.

Such exceptional record information (record information) is recorded into record information recording means 41 at the time point when such a recording has been carried out. In the second embodiment, in the case where recording is exceptionally carried out at a position different from the primary recording position as described above, recording is carried out in order from the far end of empty area. When the recording method is carried out in this way, recording position can be determined irrespective of the length of information to be recorded without allowing the recording area to be useless. This is convenient. As a method of copying where writing is not correctly carried out with respect to respective recording element, various other methods are conceivable in addition to the above. Such an example is described in the previously described first embodiment.

Figure 13:
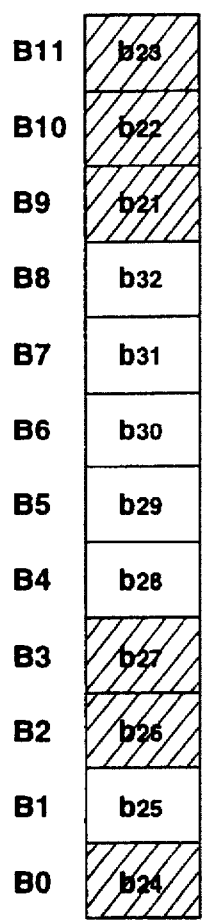
FIG. 13 is a view for explaining the operation of the information buffer of the information transfer system of the second embodiment.

FIGS. 12 and 13 are views for explaining the operation of control register 81 and information buffer 22 that input/output control circuit 21 and write control circuit 23 of the FIG. 9 mentioned above use.

Also in this example, control register 81 comprises, as shown in FIG. 12, of P1 register, P2 register, P3 register for holding information block numbers stored next into respective recording medium pieces $31_1$, $31_2$, $31_3$, Q register for holding the information block number to be next transferred from information providing device 1, and T register indicating whether the transfer request is carried out. In the case where the transfer request is issued, TRUE (=0) is set at T register. In the case where there is no need for more transfer of information, FALSE (=1) is set at T register.

Moreover, as shown in FIG. 13, information blocks transmitted from information providing device 1 are cyclically recorded in information buffer 22.

Namely, information transferred from information providing device 1 are temporarily stored into information buffer 22 before being written into three recording medium pieces $31_1$, $31_2$, $31_3$. For example, information (b24, b27, b30, b21) written into recording medium piece $31_1$ are stored in 0, 3, 8, 9 addresses indicated by B0, B3, B6, B9 in the figure of information buffer 22, information (b25, b28, b31, b22) written into recording medium piece $31_2$ are stored in 1, 4, 7, 10 addresses indicated by B1, B4, B7, B10 in the figure of information buffer 22, and information (b26, b29, b32, b23) written into recording medium piece $31_3$ are stored in 2, 5, 8, 11 addresses indicated by B2, B5, B8, B11 in the figure of information buffer 22.

It is to be noted that, in the example of FIG. 13, information blocks to which slanting lines are implemented in the figure of information blocks stored in information buffer 22 are information blocks which have been already caused to undergo writing into recording medium pieces, wherein writing operations of information (b27) up to the 27-th block have been completed in recording medium piece $31_1$, writing operations of information (b22) up to the 22-th block have been completed in recording medium piece $31_2$, and writing operations of information (b26) up to the 26-th block have been completed in recording medium piece $31_3$. Further, information up to the 32-th block have been already stored in information buffer 22.

In this state, information blocks up to number preceding by one of r in the figure of minimum value of P1, P2, P3 registers, i.e., information blocks up to the 24-th block in this example have been already caused to undergo writing into recording medium pieces. Accordingly, it is possible to transfer new information up to the area where the information of the 24-th block is stored of information buffer 22 to store it thereinto.

Figure 14:
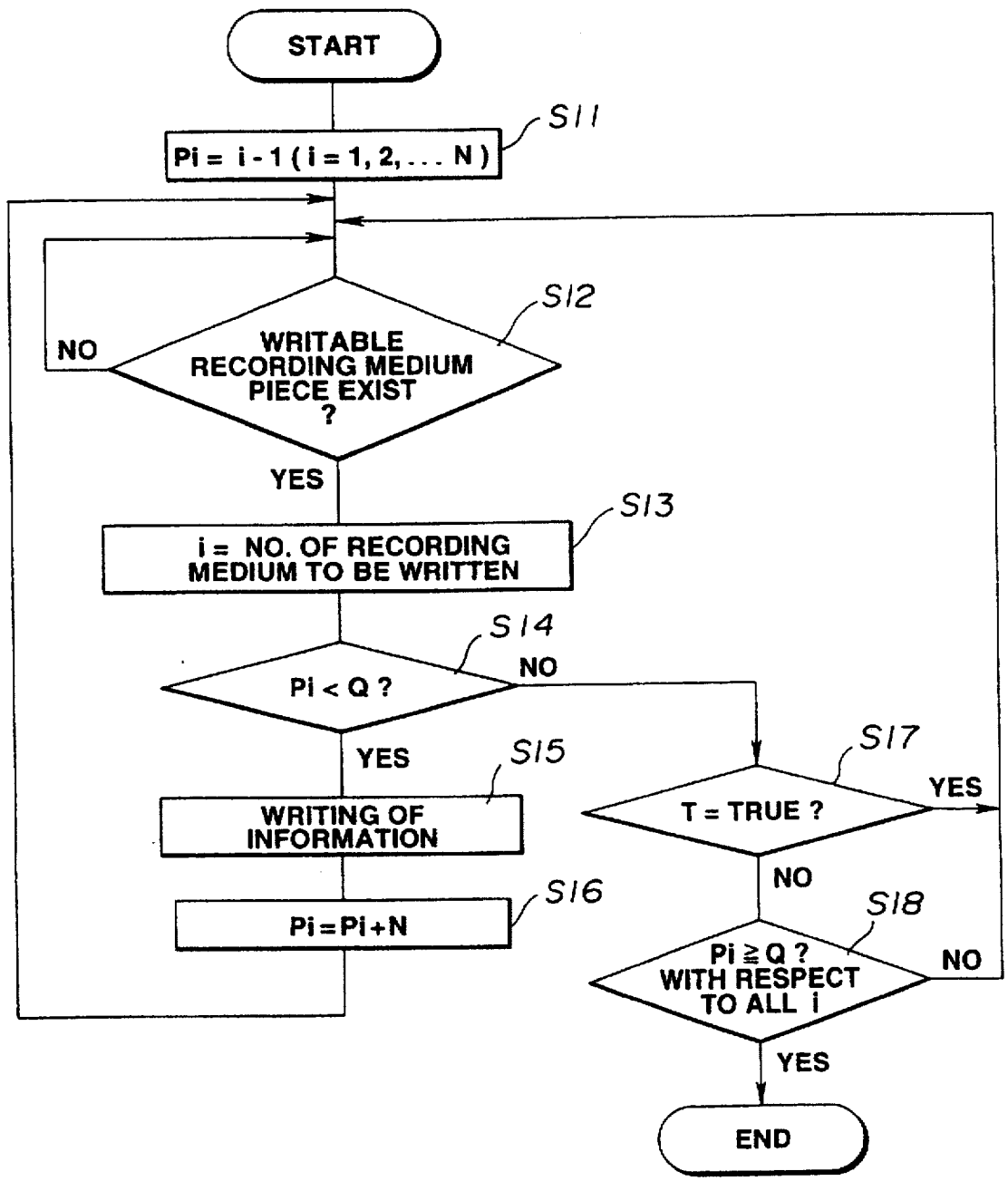
FIG. 14 is a flowchart showing a flow of processing at a write control circuit of the information recording device of the second embodiment.
Figure 15:
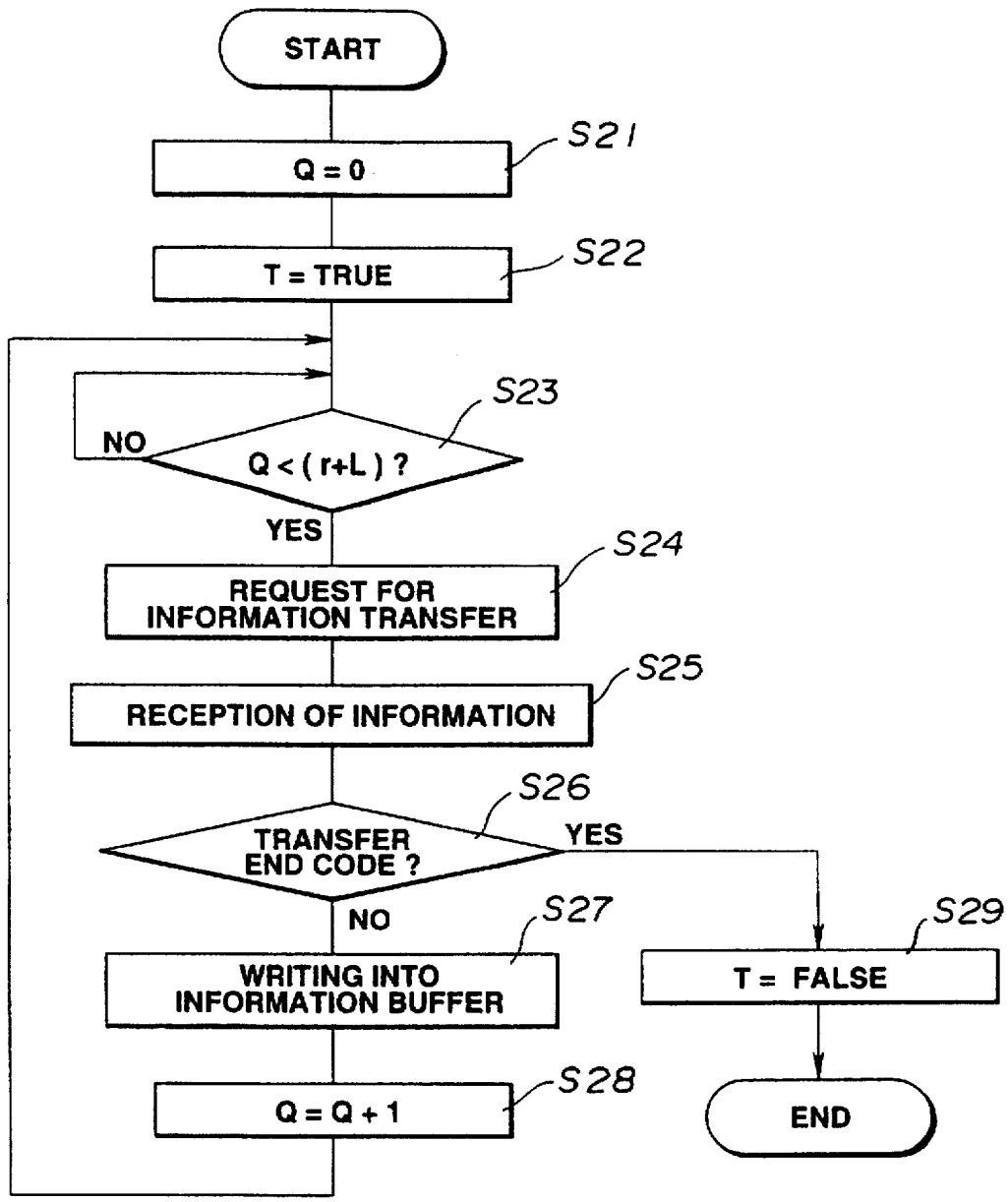
FIG. 15 is a flowchart showing a flow of processing at a input/output control circuit of the information recording device of the second embodiment.

FIG. 14 shows an example of a processing method in write control circuit 23 in the second embodiment, and FIG. 15 is a flowchart indicating an example of the processing method at input/output control circuit 21 in the second embodiment. In FIG. 14, write control circuit 23 initially sets, at step S1, values of $P_1=0$, $P_2=1$, $P_3=2$ at respective registers of $P_1$, $P_2$, $P_3$. In this case, i=1, 2, 3, ... N.

At step S12, whether a writable recording medium piece exists is checked. If there is no writable recording medium piece (in the case of a NO determination at step S12), the determination of step S12 is repeated to wait until any writable recording medium piece appears. On the other hand, if writable recording medium piece exists, the processing operation proceeds to step S13.

At step S13, a recording medium piece in which writing is to be actually written is set. A plurality of recording medium pieces are writable, it is sufficient to check values of Pi of registers respectively corresponding thereto to select a recording medium piece having a value of minimum Pi.

At step S14, comparison between the value of selected Pi and the value of Q register is made. In the case where the value of Pi is smaller than the value of Q register (YES), this indicates that corresponding information has been already stored in information buffer 22. Accordingly, the processing operation proceeds to step S15. At this step S15, writing into a recording medium piece is carried out.

After writing at this step S15 is completed, the value of Pi is increased (incremented) at step S16.

On the contrary, in the case where the value of Pi is not smaller than the value of Q register at step S14 (NO), it is determined that information to be written is not yet stored into information buffer 22. Accordingly, the processing operation proceeds to step S17.

At step S17, whether new information is delivered from now on is checked. Namely, at step S17, if T register is T=TRUE (YES), there is the possibility that new information is sent from now on. Accordingly, the processing operation returns to step S12 to repeat the above-mentioned processing. On the other hand, at step S17, if it is determined that T=FALSE (NO), there is no possibility that new information is sent from now on. Accordingly, the operation processing proceeds to step S18.

At step S18, whether information stored in information buffer 22 have been all written into recording medium pieces is checked. If the information have been already written (YES), the processing is completed. In contrast, if any information is not yet written (NO), the operation processing returns to step S12 to repeat the above-mentioned processing.

In FIG. 15, input/output control circuit 21 initially sets, at steps S21 and S22, the value of the Q register to 0 (Q=0), and sets the T register to T=TRUE to start processing.

At the subsequent step S23, whether a writable area is ensured in information buffer 22 is checked. This determination is carried out by determining the value of (r+L) from the minimum value r and buffer length L of Pi (i=1, 2, 3) to check whether the value Q register is smaller than (r+L). In the case where it is determined at step S23 that the writable area is not ensured in information buffer 22 (NO), the determination of step S23 is repeated to wait until the writable area is ensured. If writable area is ensured in the information buffer (YES), the operation processing proceeds to step S24.

At step S24, information transfer is requested to information providing device 1 to receive that information at the subsequent step S25.

At step S28, whether the information sent is transfer end code is checked. If not so (NO), the operation processing proceeds to step S27.

At step S27, that information is written into information buffer 22. Then, the operation processing proceeds to step S28. At step S28, the value of Q register is increased (incremented) by 1.

In the case where transfer end code is sent at step S26 (YES), the content of T register is caused to be FALSE so that write control circuit 23 can recognize that no more information is transferred.

While it is assumed in FIGS. 14 and 15 that the end time of step S11 and the end time of step S22 are synchronized with each other, it is not difficult to make such a synchronization. While, particularly in the second embodiment shown in FIG. 9, input/output control circuit 21 and write control circuit 23 are of separate structure, of course it is possible that the same control means may have these functions from a viewpoint of hardware. If such a configuration is employed, synchronization can be easily made between the input/output control circuit and the write control circuit.

The feature of the above-described information transfer system thus resides in that transfer order (sequence) of information blocks is fixed at all times. Thus, the necessity of designating, at all times, the portion transmitted from information recording device 2 to information providing device 1 is eliminated. An information transfer request signal from information recording device 2 to information providing device 1 can be realized by transmitting, e.g., a pulse signal of 1 bit. This similarly applies to the case where memory configuration of the information recording device is changed. By the information transfer system of this invention, information transfer to a variety of information recording devices can be efficiently realized.

Moreover, in the case of sequentially transferring information in a fixed recording order, assuming that information buffer is not used, in the case where it takes long time in recording into a certain recording medium piece, it becomes unable to transfer information to be written next and information subsequent thereto into that recording medium piece. Employment of an information buffer is useful for eliminating such inconvenience which takes place in the case where parallel information writing operations are carried out with respect to a large number of recording medium pieces. Namely, since before writing into a corresponding recording medium piece of a certain portion of information is completed, information subsequent to that portion has been already transferred, it is possible to carry out writing into any other recording medium piece. In the case where the buffer is filled, transfer of information is interrupted. For example, in the case of an EPROM, since write times with respect to a greater part of memory elements have relatively small unevenness (variation), writing can be made by a substantially uniform time when several memory blocks are combined to take an average of write times thereof. Accordingly, the buffer is caused to have capacity sufficient to absorb such unevenness, thereby making it possible to reduce the frequency that transfer of information is interrupted. Thus, the entire write time can be shortened.

As the configuration of the information buffer 22, various configurations are conceivable in addition to the configuration shown in FIG. 13.

Figure 16:
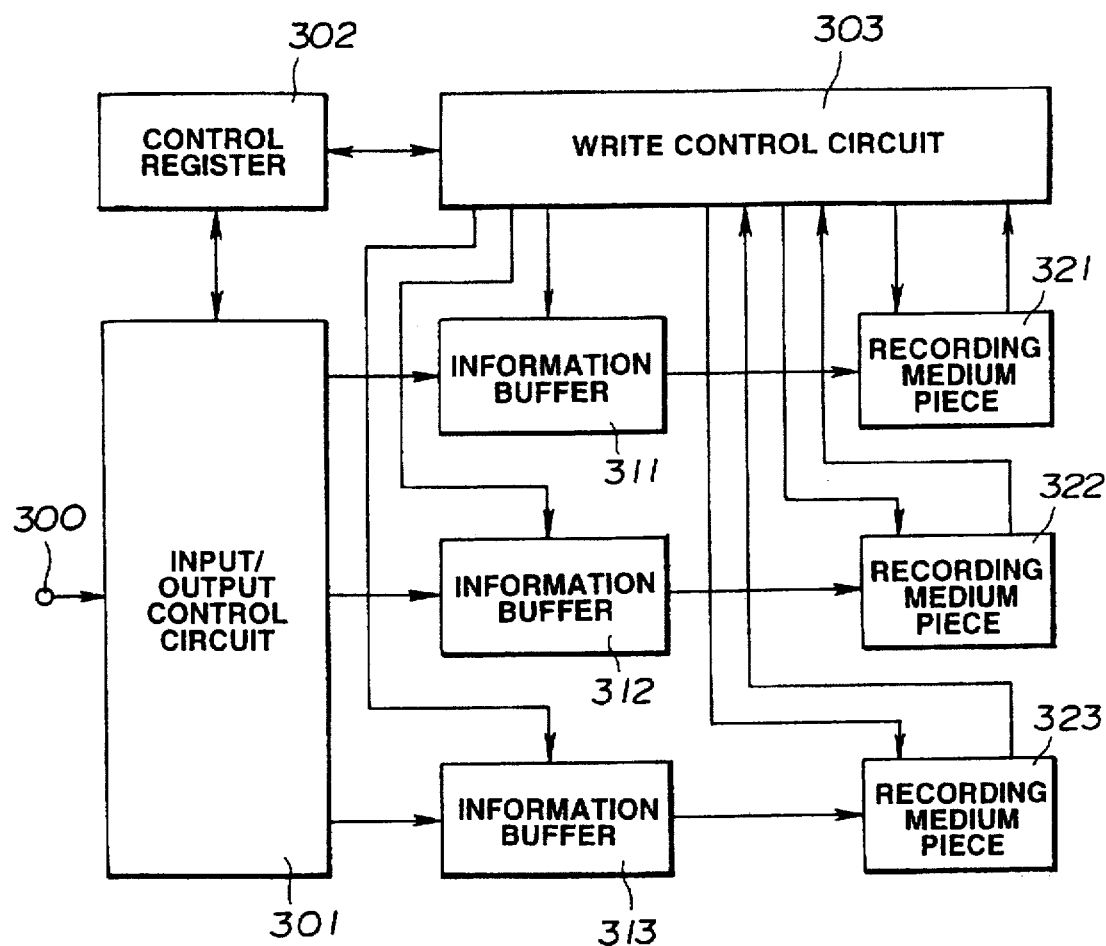
FIG. 16 is a circuit diagram illustrated in a block form for explaining another method of constructing an information buffer of the information recording device of the second embodiment.
Figure 18:
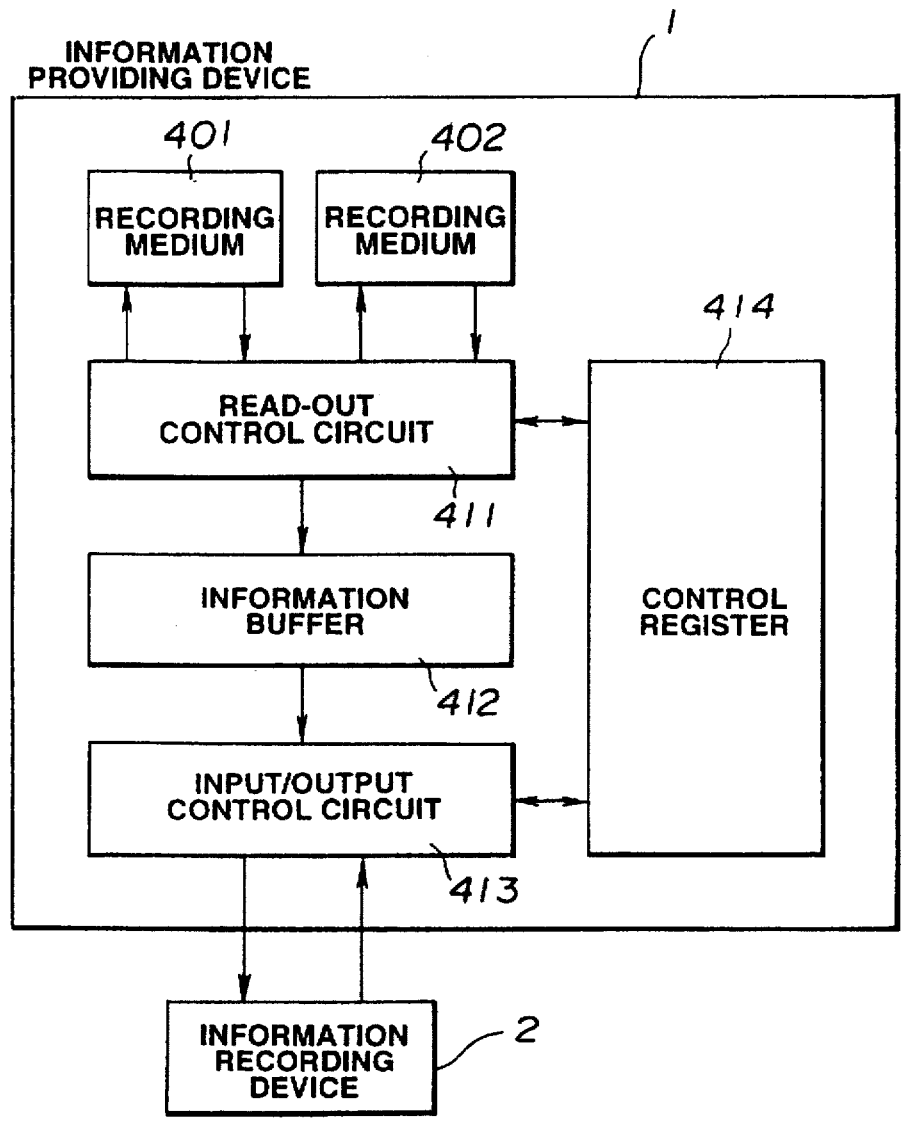
FIG. 18 is a circuit diagram showing, in a block form, a detailed configuration of the information providing device of the second embodiment along with the information recording device.
Figure 19:
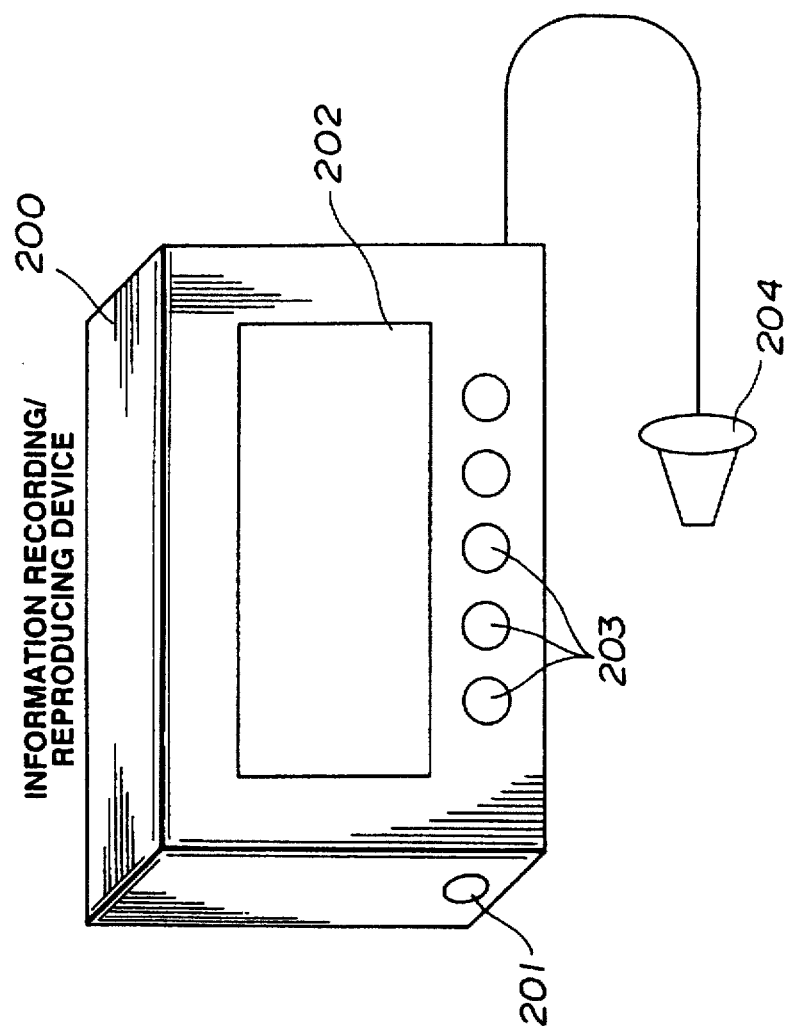
FIG. 19 is an appearance view of an information recording/reproducing device.
Figure 20:
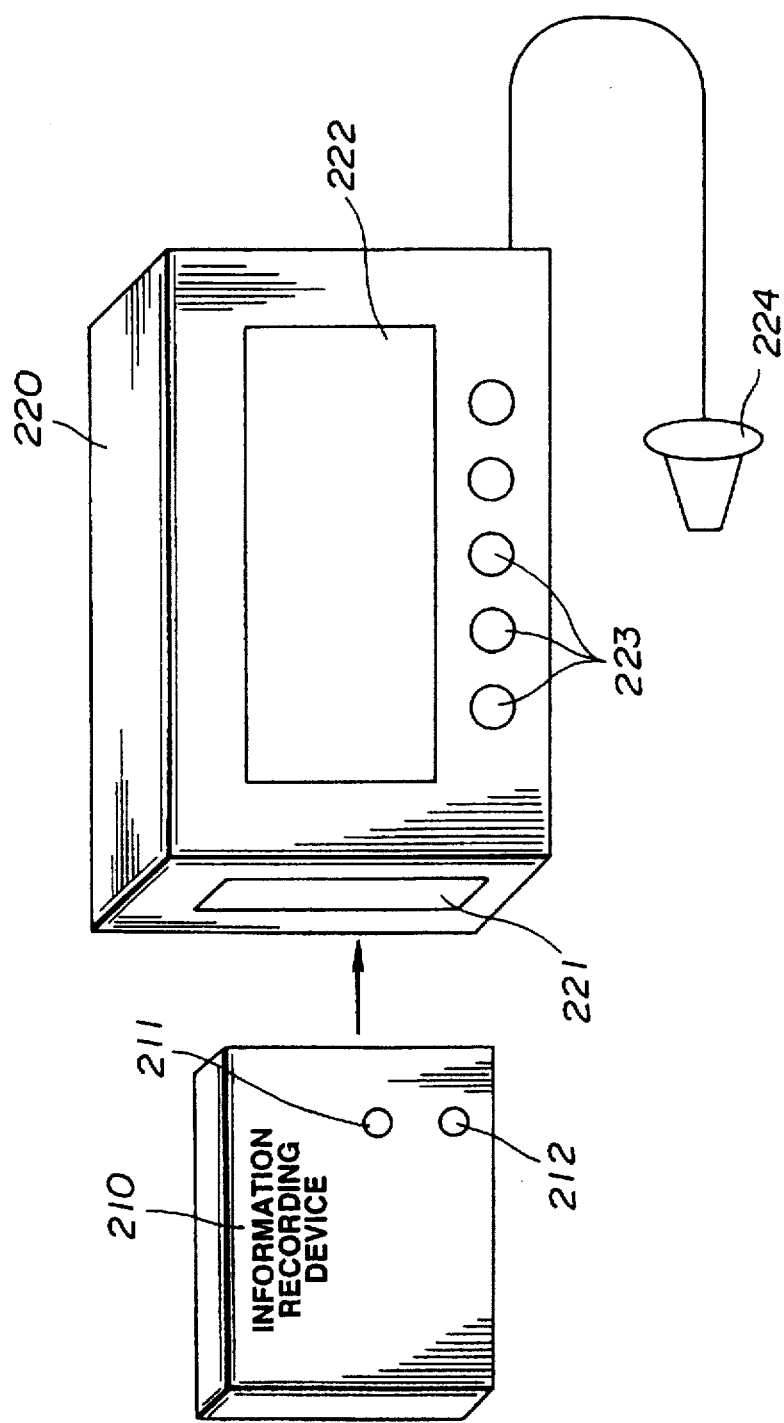
FIG. 20 is an appearance view of an information recording device and an information reproducing device.

For example, FIG. 18 shows another example of the configuration of the information buffer. In the example of FIG. 16, information buffers are separately provided in correspondence with respective recording medium pieces 321, 322, 323. Respective information buffers 311, 312, 313 are of so called FIFO (First-In-First-Out) memory structure such that information input first is output first.

Similarly to the FIG. 9 previously mentioned, input/output control circuit 301 and write control circuit 303 carry out control by using control register 302.

First, input/output control circuit 301 distributes information which has been transferred through terminal 300 into respective information buffers 311, 312, 313. In this case, since the relationship between information blocks and information buffers into which those information blocks are distributed can be determined by the number of the information block, i.e., order in which information blocks are transferred. Such distribution is easy.

It should be noted that while it is desirable for simplifying processing within information recording device to set the size of the information block on the basis of the size of the write unit into the recording medium, it is desirable that a variety of recording media can be used in dependency upon respective information recording devices. In view of this, there may be employed a method of transmitting the size of the information block from the information recording device to the information providing device before information transfer is started. Even employment of such a method does not lose the feature of this invention that the order of information sent out from the information providing device is kept fixed and information can be transferred to information recording devices which take a variety of memory configurations by simple control.

Moreover, as a modification of the above-described method of recording information blocks into a plurality of recording medium pieces in a traversing order, there is conceivable, e.g., a method of writing transferred information blocks into recording medium pieces 61, 62, 63 ($31_1$, $31_2$, $31_3$ of FIG. 9 or 321, 322, 323 of FIG. 16).

Figure 17C:
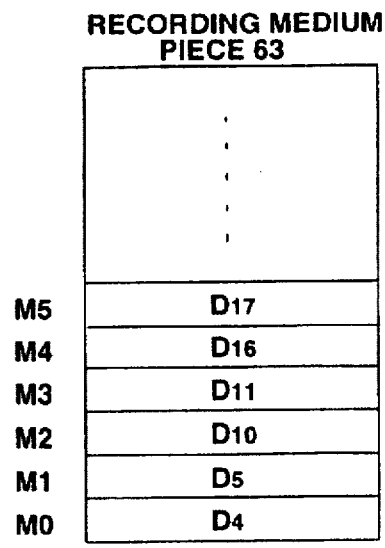
FIGS. 17A, 17B and 17C show a view for explaining an example of another information recording method in the information recording device of the second embodiment.
Figure 17B:
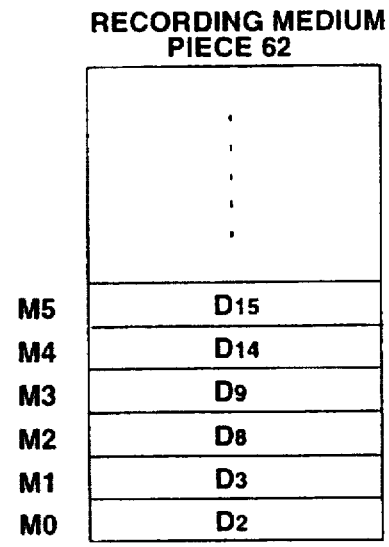
Figure 17A:
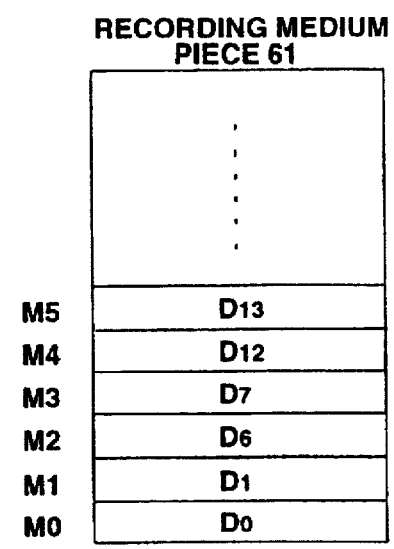

In the example of FIG. 17, a method of recording two information blocks into two memory blocks is repeated in a traversing order with respect to recording medium pieces 61, 62, 63. In this case, it is possible to grasp that the feature of such recording method resides in that unit of the information block is originally set to a value twice that of the memory block. Since this method records information blocks in a traversing order with respect to the set of recording medium pieces, of course it is possible that this method is included in the recording method in the information recording device of this invention. In addition, there may be conceivable various modifications (not shown) such as a method of allowing order traversing recording medium pieces to be zigzag, etc. These methods are included in the recording method in the information recording device of this invention.

As described above, in accordance with the information transfer system of the second embodiment of this invention, since the order of information transferred to a variety of information recording devices which take various memory configurations is fixed at all times, a recording medium which can only sequentially read out information can be used in the information providing device. Further, since the transfer order is fixed, it is possible to read out, in advance, information from the recording medium to store them into the buffer. Accordingly, an information transfer system such that recording media which can only read out information at a relatively low speed are used in parallel as a large capacity recording medium of the information providing device to input information therefrom into a buffer capable of carrying out high speed read/write operation thereafter to transfer them to the information recording device can be realized by simple control.

FIG. 18 shows an example of information providing device 1 in which a buffer is provided in a manner stated above, together with information recording device 2.

In FIG. 18, respective information of the X of information block next transferred to information recording device 2, Y of the information block next transferred to information buffer 412, and size Z of the information block are recorded in control register 414. Prior to transfer, X and Y are reset to zero.

Moreover, information recording device 2 transmits the size of the information block, and input/output control circuit 413 records this value as Z into control register 414. At times subsequent thereto, input/output control circuit 413 checks control register 414 every time a information transfer request from information recording device 2 is issued, whereby when a necessary information block is stored in information buffer 412, the circuit 413 transmits that necessary information block to change the value of X.

Further, read-out control circuit 411 checks control register 414, whereby if there is any empty area in information buffer 412, the circuit 411 reads out necessary information from recording medium 401 and/or recording medium 402 to store them into information buffer 412 to change the value of Y. At times subsequent thereto, the read-out control circuit 411 repeats these control operations.

It should be noted that in the case where information buffer 412 is provided in information providing device 1 as shown in FIG. 18, information transferred on the basis of the information transfer request signal from information recording device 2 may be directly written into respective recording medium pieces without providing information buffer 22 shown in FIG. 9 in information recording device 2.

Moreover, in FIG. 18, information to be caused to be subjected transmission/reception between information recording device 2 and information providing device 1 may be allowed to undergo transmission/reception in a time divisional manner, thereby making it possible to reduce the number of pins of input/output in the case of carrying out transmission of information between information providing device 1 and information recording device 2.

Figure 21:
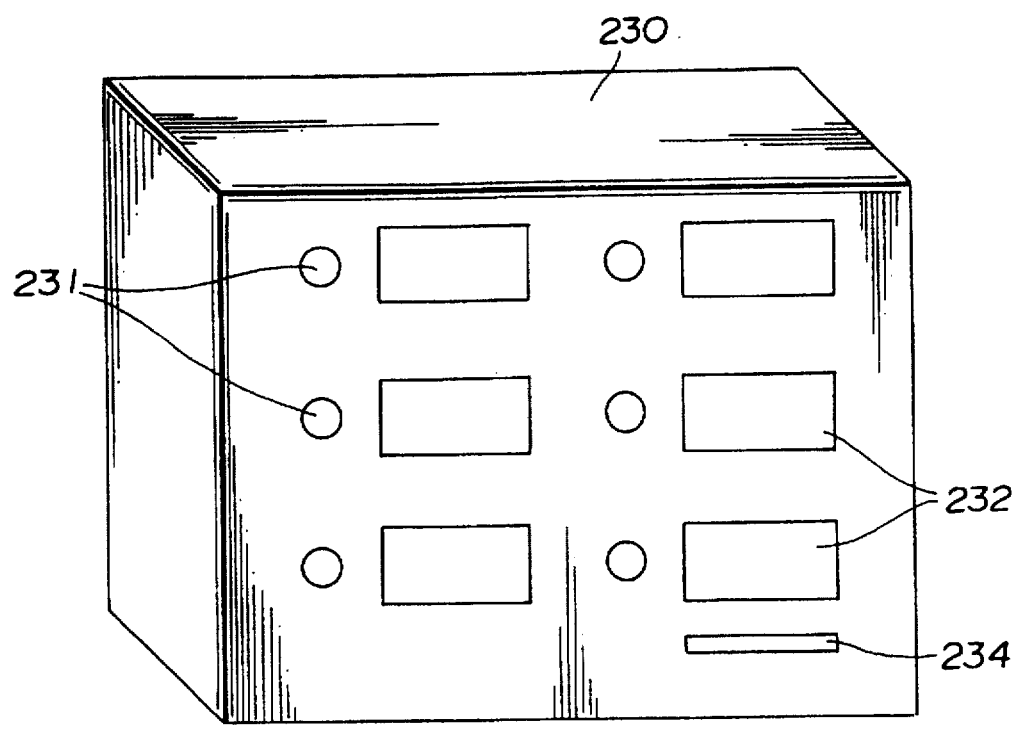
FIG. 21 is an appearance view of an information providing device.
Figure 22:
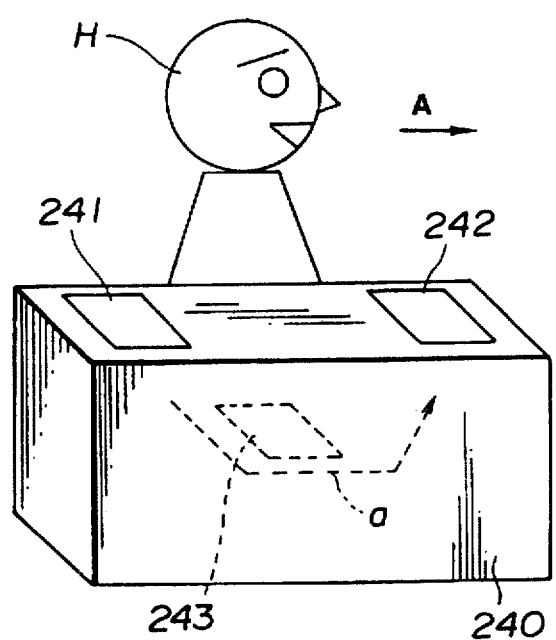
FIG. 22 is an appearance view of another information providing device.
Figure 23:
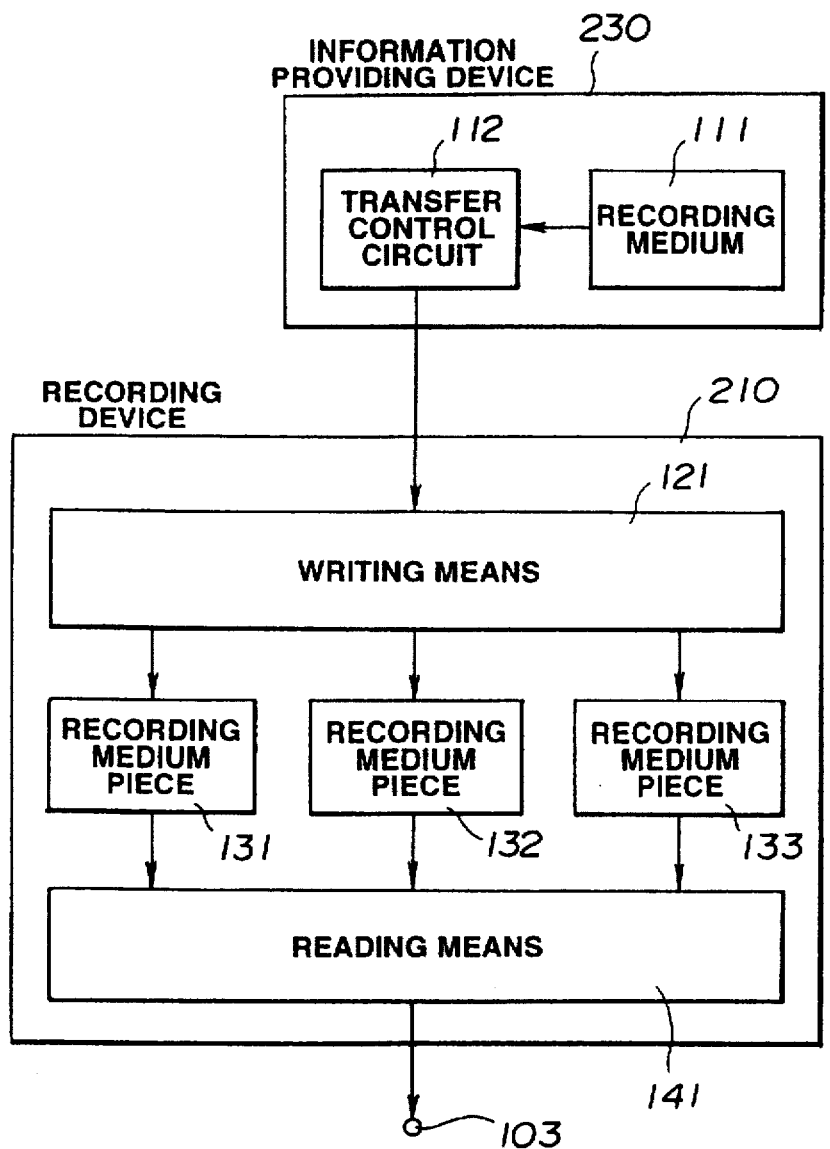
FIG. 23 is a circuit diagram showing, in a block form, an outline of the configuration of an information recording device and an information providing device conventionally proposed.

While explanation has been given by taking the example where speech information is transferred from the information providing device as shown in FIG. 21 to the information recording device, it is needless to say that this invention may be applied to the case where information is transferred from the information providing (transmitting) side in general information transfer system to information recording devices, and information contents handled in the system may be applied to various information without being necessarily limited to speech information. For example, particularly, information recording device which has once undergone transfer of information may be considered as a new information providing (transmitting) device of the information transfer system, thus making it possible to transfer information from this device to other information recording devices. In this case, if the information buffer is caused to be, at the time of the write operation, a buffer commonly used at the time of read-out, cost of the system can be reduced. This is convenient.

As is clear from the foregoing description, in accordance with the second embodiment of this invention, it is possible to record information in parallel by simple control with respect to variety of information recording devices constituted with recording media in which write times are not fixed. Thus, information can be transferred at a high speed by simple hardware.

What is claimed is:

1. An information recording device comprising:

information input means for receiving input information;

temporary recording means for temporarily recording the input information; and means for recording the input information on a recording medium, thereby to temporarily store information input through the information input means in the temporary recording means and thereafter to record it in the recording medium, wherein the temporary recording means has a higher write speed than the recording medium, the recording medium comprises a plurality of recording medium pieces, recording into the plurality of recording medium pieces is carried out in parallel, the information input means time-divides the input information to record the divided information into the plurality of recording medium pieces, and the times required for recording into the respective recording medium pieces vary from one to another of said recording medium pieces, so that recording in at least one of said recording medium pieces is sometimes not completed within a predetermined time;

means for exceptional recording of information not recorded within said predetermined time; and recording information recording means for recording information about said exceptional recording.

2. The information recording device as set forth in claim 1, further comprising request information output means for successively outputting request information of information units of the input information, whereby the information input means carries out input of information units of the input information on the basis of the request information.

3. The information recording device as set forth in claim 2, wherein the information input means includes the request information output means, and is operative to time-divide an output of the request information and an input of the input information.

* * * * *